United States Patent
Yuasa et al.

(10) Patent No.: US 8,447,703 B2
(45) Date of Patent: May 21, 2013

(54) PRODUCT DELIVERY SYSTEM

(75) Inventors: Naohiro Yuasa, Yokohama (JP); Yohei Kawada, Sagamihara (JP); Daisuke Shibata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 241 days.

(21) Appl. No.: 12/841,947

(22) Filed: Jul. 22, 2010

(65) Prior Publication Data

US 2011/0087612 A1 Apr. 14, 2011

(30) Foreign Application Priority Data

Oct. 14, 2009 (JP) .................................. 2009-236796

(51) Int. Cl.
*G06Q 30/00* (2012.01)
(52) U.S. Cl.
USPC ......................................................... 705/332
(58) Field of Classification Search
USPC ......................................................... 705/332
See application file for complete search history.

(56) References Cited

U.S. PATENT DOCUMENTS

| 2002/0032507 A1* | 3/2002 | Diaz et al. ........................ 701/33 |
| 2008/0294488 A1* | 11/2008 | Gupta et al. ...................... 705/8 |
| 2009/0063032 A1* | 3/2009 | Das ................................. 701/201 |

FOREIGN PATENT DOCUMENTS

JP 2009-009294 1/2009

OTHER PUBLICATIONS

Zagone, Eileen. "Choosing and Using Scrap Radiation Detection Equipment." Modern Casting, v 89, n 11, p p43. Nov. 1999.*

* cited by examiner

*Primary Examiner* — John Hayes
*Assistant Examiner* — Allen J Jung
(74) *Attorney, Agent, or Firm* — Foley & Lardner LLP

(57) ABSTRACT

A sensor device for detecting product quality conditions is attached to each product to be delivered, and constant monitoring is performed on quality conditions of stock products in a storage room of a delivery center for quality assurance. For products in a storage room of a delivery truck, constant monitoring is also performed on quality conditions thereof in the same manner. If a quality abnormality is found in a product in the storage room, information regarding product sensing items and information regarding the current location of each delivery truck are processed to select a replacement stock product less susceptible to recurrence of a similar quality abnormality at the time of redelivery.

16 Claims, 20 Drawing Sheets

FIG. 3

213
<INVENTORY TABLE>

| DELIVERY CENTER ID | PRODUCT CODE | STOCK QUANTITY |
|---|---|---|
| C-0001 | 4910001 | 10 |
| C-0001 | 49442423 | 1 |
| C-0002 | 49442423 | 1 |

400 = DELIVERY CENTER ID, 401 = PRODUCT CODE, 402 = STOCK QUANTITY

FIG. 4

214
<CUSTOMER MASTER TABLE>

| CUSTOMER ID | CUSTOMER NAME | E-MAIL ADDRESS |
|---|---|---|
| P-0001 | CUSTOMER A | aaaa@pp.aa |
| P-0002 | CUSTOMER B | bbbb@pp.bb |
| P-0003 | CUSTOMER C | cccc@pp.cc |

410 = CUSTOMER ID, 411 = CUSTOMER NAME, 412 = E-MAIL ADDRESS

FIG. 5

215
<PRODUCT MASTER TABLE>

| PRODUCT CODE | PRODUCT NAME | MANUFACTURER NAME | TEMPERATURE | HUMIDITY | IMPACT |
|---|---|---|---|---|---|
| 4910001 | DIGITAL CAMERA A | ELECTRIC APPLIANCE MANUFACTURER A | 0-30 | 50-100 | 0-1 |
| 4910003 | PERSONAL COMPUTER A | ELECTRIC APPLIANCE MANUFACTURER A | 0-30 | 50-100 | 0-1 |
| 4922222 | FRESH FISH A | FRESH FISHERY A | 10-20 | 50-100 | 0-1 |
| 4933333 | FRESH FISH B | FRESH FISHERY A | -10-0 | 50-100 | 0-1 |
| 49442423 | FROZEN FOOD A | FRESH FISHERY A | -30-0 | 50-100 | 0-1 |
| 4935253252 | FROZEN FOOD B | FRESH FOODSTUFFS A | BELOW 0 | 50-100 | 0-1 |
| 49232324 | FROZEN FOOD C | FRESH FOODSTUFFS A | -10-5 | 50-100 | 0-1 |

420 = PRODUCT CODE, 421 = PRODUCT NAME, 422 = MANUFACTURER NAME, 423 = TEMPERATURE, 424 = HUMIDITY, 425 = IMPACT

FIG. 6

216
<INDIVIDUAL PRODUCT INFORMATION TABLE>

| PRODUCT TAG ID | PRODUCT CODE |
|---|---|
| 3241BAE134324 | 4910001 |
| 3241BAE134325 | 49442423 |
| 3241BAE134326 | 49442423 |
| 3241BAE134327 | 4933333 |
| 3241BAE134328 | 49442423 |
| 3241BAE134329 | 4935253252 |
| 3241BAE134330 | 49232324 |

FIG. 7

217
<DELIVERY CENTER MASTER TABLE>

| DELIVERY CENTER ID | DELIVERY CENTER NAME | ADDRESS | OPERATING HOURS | E-MAIL ADDRESS |
|---|---|---|---|---|
| C-0001 | DISTRIBUTION COMPANY A | TOTSUKA F, YOKOHAMA, KANAGAWA PREFECTURE | 6-24 | aaaa@cc.aa |
| C-0002 | DISTRIBUTION COMPANY B | TOTSUKA G, YOKOHAMA, KANAGAWA PREFECTURE | 0-24 | bbbb@cc.bb |
| C-0003 | DISTRIBUTION COMPANY C | TOTSUKA H, YOKOHAMA, KANAGAWA PREFECTURE | 10-18 | cccc@cc.cc |

<DELIVERY CENTER STORAGE ROOM SPECIFICATION MASTER TABLE>

| DELIVERY CENTER ID | STORAGE ROOM ID | TEMPERATURE | HUMIDITY |
|---|---|---|---|
| C-0001 | STORAGE ROOM 1 | -30-0 | 30-60 |
| C-0001 | STORAGE ROOM 2 | 0-30 | 30-50 |
| C-0002 | STORAGE ROOM 1 | -20-0 | 30-40 |
| C-0002 | STORAGE ROOM 2 | 0-20 | 60-80 |
| C-0003 | STORAGE ROOM 1 | -5-0 | 10-15 |

<DELIVERY TRUCK MASTER TABLE>

| DELIVERY TRUCK ID | DELIVERY TRUCK NAME | CURRENT LOCATION | E-MAIL ADDRESS |
|---|---|---|---|
| T-0001 | TRUCK A | TOTSUKA Y, YOKOHAMA, KANAGAWA PREFECTURE | aaaa@tt.aa |
| T-0002 | TRUCK B | TOTSUKA Z, YOKOHAMA, KANAGAWA PREFECTURE | bbbb@tt.bb |

<DELIVERY TRUCK STORAGE ROOM SPECIFICATION MASTER TABLE>

| DELIVERY TRUCK ID | STORAGE ROOM ID | TEMPERATURE | HUMIDITY | IMPACT |
|---|---|---|---|---|
| T-0001 | STORAGE ROOM 1 | -30-0 | 30-60 | 0-1 |
| T-0001 | STORAGE ROOM 2 | 0-30 | 30-50 | - |
| T-0002 | STORAGE ROOM 1 | -40-0 | 30-40 | 0-2 |

FIG. 11

<RECEIPT-OF-PRODUCT STATUS TABLE> 221

| PRODUCT TAG ID | DELIVERY CENTER ID | TEMPERATURE | HUMIDITY | IMPACT | PACKING LEVEL | TIME AND DATE | PRODUCT STATUS |
|---|---|---|---|---|---|---|---|
| 3241BA E134324 | C-0001 | 10 | 50 | 10 | S | 2004/12/15 13:14:29 | RECEIVED |
| 3241BA E134325 | C-0002 | -10 | 50 | 0 | S | 2004/12/15 13:21:54 | SHIPMENT ALLOWABLE |
| 3241BA E134326 | C-0001 | -10 | 50 | 3 | A | 2004/12/15 13:21:54 | SHIPMENT ALLOWABLE |
| 3241BA E134327 | C-0003 | 10 | 50 | 4 | A | 2004/12/15 13:29:20 | IN PREPARATION |
| 3241BA E134328 | C-0001 | -5 | 50 | 0 | B | 2004/12/15 17:23:17 | SHIPPED |
| 3241BA E134329 | C-0002 | 10 | 50 | 30 | B | 2004/12/15 17:23:17 | SHIPPED |
| 3241BA E134330 | C-0003 | 10 | 50 | 30 | C | 2004/12/15 17:23:17 | SHIPPED |

<SHIPMENT-OF-PRODUCT INFORMATION TABLE>

| PRODUCT TAG ID | CUSTOMER ID | DELIVERY DESTINATION | DELIVERY TRUCK ID |
|---|---|---|---|
| 3241BA E134325 | P-0001 | TOTSUKA Y, YOKOHAMA, KANAGAWA PREFECTURE | T-0001 |
| 3241BA E134326 | P-0001 | TOTSUKA Y, YOKOHAMA, KANAGAWA PREFECTURE | T-0001 |
| 3241BA E134327 | P-0002 | TOTSUKA Y, YOKOHAMA, KANAGAWA PREFECTURE | T-0002 |
| 3241BA E134328 | P-0003 | TOTSUKA Z, YOKOHAMA, KANAGAWA PREFECTURE | T-0002 |
| 3241BA E134329 | P-0003 | TOTSUKA Z, YOKOHAMA, KANAGAWA PREFECTURE | T-0002 |
| 3241BA E134330 | P-0003 | TOTSUKA Z, YOKOHAMA, KANAGAWA PREFECTURE | T-0002 |

<DELIVERY CENTER STORAGE ROOM STATUS TABLE>

| DELIVERY CENTER ID | STORAGE ROOM ID | TEMPERATURE | HUMIDITY | IMPACT | TIME AND DATE |
|---|---|---|---|---|---|
| C-0001 | STORAGE ROOM 1 | -10 | 40 | 0.1 | 2004/12/15 13:14:29 |
| C-0001 | STORAGE ROOM 2 | 10 | 35 | - | 2004/12/15 13:14:29 |
| C-0002 | STORAGE ROOM 1 | -19 | 35 | 0.5 | 2004/12/15 13:14:29 |
| C-0002 | STORAGE ROOM 2 | 20 | 70 | - | 2004/12/15 13:14:29 |
| C-0003 | STORAGE ROOM 1 | -2 | 12 | - | 2004/12/15 13:14:29 |

<DELIVERY TRUCK STORAGE ROOM STATUS TABLE>

| DELIVERY TRUCK ID | STORAGE ROOM ID | TEMPERATURE | HUMIDITY | IMPACT | TIME AND DATE |
|---|---|---|---|---|---|
| T-0001 | STORAGE ROOM 1 | -10 | 40 | 0.1 | 2004/12/15 13:14:29 |
| T-0001 | STORAGE ROOM 2 | 10 | 35 | - | 2004/12/15 13:14:29 |
| T-0002 | STORAGE ROOM 1 | -19 | 35 | 0.5 | 2004/12/15 13:14:29 |

<DELIVERY STATUS TABLE>

| PRODUCT TAG ID | TEMPERATURE | HUMIDITY | IMPACT | DELIVERY STATUS | TIME AND DATE |
|---|---|---|---|---|---|
| 3241BAE134325 | 10 | 50 | 1 | IN DELIVERY | 2004/12/15 13:14:29 |
| 3241BAE134325 | 10 | 50 | 0 | IN DELIVERY | 2004/12/15 13:21:54 |
| 3241BAE134326 | 11 | 50 | 3 | IN DELIVERY | 2004/12/15 13:21:54 |
| 3241BAE134327 | 10 | 50 | 4 | IN DELIVERY | 2004/12/15 13:29:20 |
| 3241BAE134328 | 30 | 50 | 0 | ABNORMAL | 2004/12/15 17:23:17 |
| 3241BAE134329 | 10 | 50 | 3 | IN DELIVERY | 2004/12/15 17:23:17 |
| 3241BAE134330 | 10 | 50 | 3 | ARRIVED | 2004/12/15 17:23:17 |

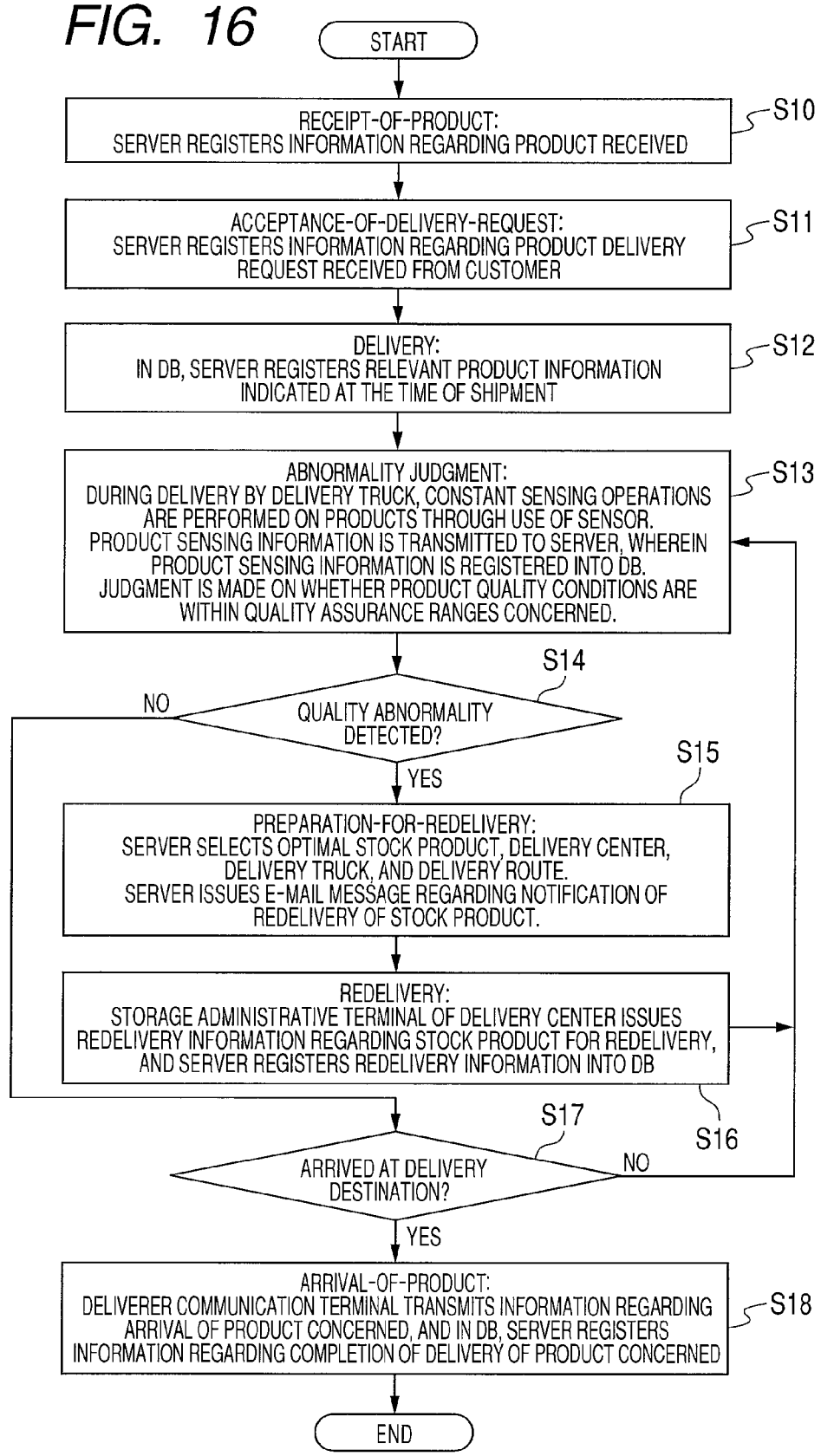

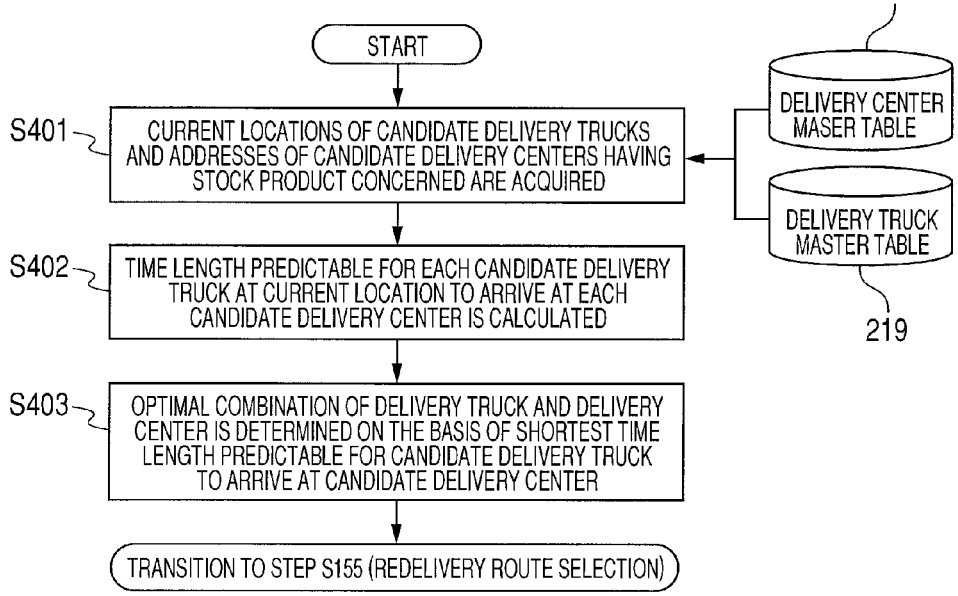
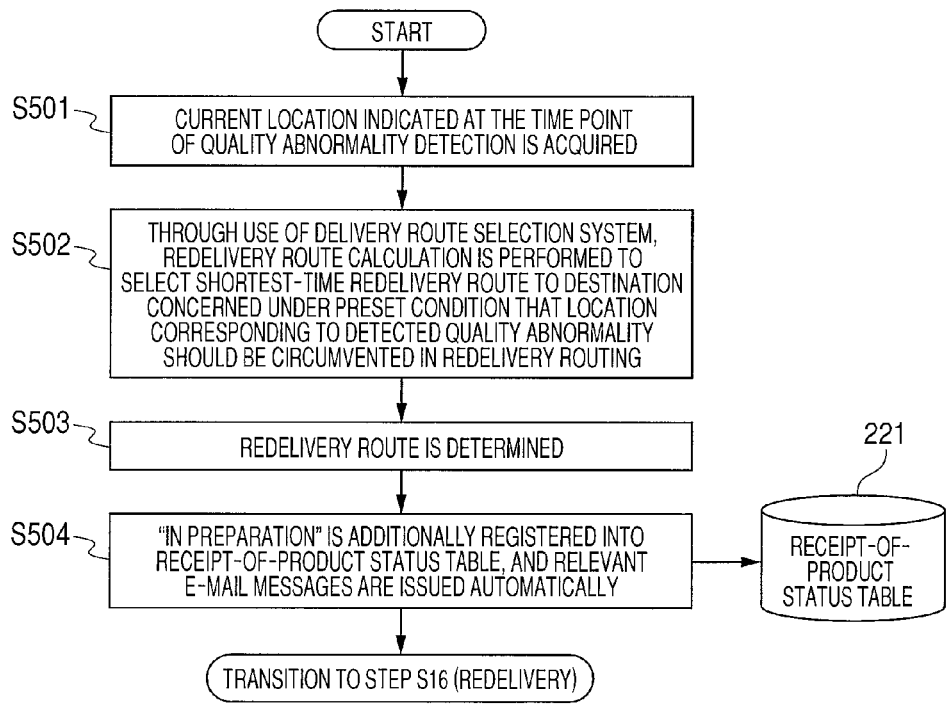

FIG. 28

<QUALITY ABNORMALITY HISTORY TABLE>

| PRODUCT TAG ID | PRODUCT CODE | TEMPERATURE | HUMIDITY | IMPACT | ABNORMALITY ITEM | ABNORMALITY CONDITION |
|---|---|---|---|---|---|---|
| 3241BAE134531 | 4933333 | 10 | 50 | 0 | TEMPERATURE | UPPER LIMIT EXCEEDED |
| 3241BAE134532 | 4933333 | 10 | 50 | 0 | TEMPERATURE | UPPER LIMIT EXCEEDED |
| 3241BAE134533 | 4933333 | 10 | 50 | 0 | TEMPERATURE | UPPER LIMIT EXCEEDED |
| 3241BAE134534 | 4933333 | -5 | 50 | 0 | TEMPERATURE | LOWER LIMIT EXCEEDED |
| 3241BAE134535 | 4933333 | 11 | 50 | 0 | TEMPERATURE | UPPER LIMIT EXCEEDED |
| 3241BAE134536 | 4933333 | -4 | 30 | 0 | HUMIDITY | LOWER LIMIT EXCEEDED |
| 3241BAE134537 | 4933333 | -5 | 50 | 3 | IMPACT | UPPER LIMIT EXCEEDED |
| 3241BAE134538 | 4935253252 | -40 | 50 | 0 | TEMPERATURE | LOWER LIMIT EXCEEDED |
| 3241BAE134539 | 4935253252 | -43 | 50 | 0 | TEMPERATURE | LOWER LIMIT EXCEEDED |

FIG. 29

<RECEIPT-OF-PRODUCT STATUS VIEW> 228

| PRODUCT TAG ID | PRODUCT CODE | DELIVERY CENTER ID | TEMPERATURE | HUMIDITY | IMPACT | PACKING LEVEL | TIME AND DATE | PRODUCT STATUS |
|---|---|---|---|---|---|---|---|---|
| 3241BAE134667 | 4933333 | C-0002 | -10 | 50 | 0 | S | 2004/12/15 17:21:59 | READY FOR SHIPMENT |
| 3241BAE134663 | 4933333 | C-0001 | -9 | 50 | 3 | A | 2004/12/15 17:21:54 | READY FOR SHIPMENT |
| 3241BAE134664 | 4933333 | C-0003 | -3 | 50 | 4 | A | 2004/12/15 17:21:57 | READY FOR SHIPMENT |
| 3241BAE134661 | 4933333 | C-0001 | -2 | 50 | 0 | B | 2004/12/15 17:21:17 | READY FOR SHIPMENT |
| 3241BAE134666 | 4933333 | C-0002 | 0 | 50 | 3 | B | 2004/12/15 17:21:17 | READY FOR SHIPMENT |
| 3241BAE134662 | 4933333 | C-0003 | 0 | 50 | 3 | C | 2004/12/15 17:21:17 | READY FOR SHIPMENT |
| 3241BAE134680 | 4933333 | C-0003 | 30 | 50 | 3 | C | 2004/12/15 17:21:17 | READY FOR SHIPMENT |

<ARRIVAL-OF-PRODUCT HISTORY TABLE>

| PRODUCT TAG ID | PRODUCT CODE | TEMPERATURE | HUMIDITY | IMPACT |
|---|---|---|---|---|
| 3241BAE134831 | 4933333 | -6 | 50 | 0 |
| 3241BAE134832 | 4933333 | -2 | 50 | 0 |
| 3241BAE134833 | 4933333 | -7 | 50 | 0 |
| 3241BAE134834 | 4933333 | -7 | 50 | 0 |
| 3241BAE134835 | 4933333 | -1 | 50 | 0 |
| 3241BAE134836 | 4933333 | 0 | 30 | 0 |
| 3241BAE134837 | 4933333 | -5 | 50 | 1 |
| 3241BAE134838 | 4935253252 | -4 | 50 | 0 |
| 3241BAE134839 | 4935253252 | -3 | 50 | 0 |

FIG. 31

<RECEIPT-OF-PRODUCT STATUS VIEW>

| PRODUCT TAG ID | PRODUCT CODE | DELIVERY CENTER ID | TEMPERATURE | HUMIDITY | IMPACT | PACKING LEVEL | TIME AND DATE | PRODUCT STATUS |
|---|---|---|---|---|---|---|---|---|
| 3241BAE134867 | 4933333 | C-0002 | -4 | 50 | 0 | S | 2004/12/15 17:21:59 | READY FOR SHIPMENT |
| 3241BAE134863 | 4933333 | C-0001 | -3 | 50 | 3 | A | 2004/12/15 17:21:54 | READY FOR SHIPMENT |
| 3241BAE134864 | 4933333 | C-0003 | -5 | 50 | 4 | A | 2004/12/15 17:21:57 | READY FOR SHIPMENT |
| 3241BAE134861 | 4933333 | C-0001 | -2 | 50 | 0 | B | 2004/12/15 17:21:17 | READY FOR SHIPMENT |
| 3241BAE134866 | 4933333 | C-0002 | -1 | 50 | 3 | B | 2004/12/15 17:21:17 | READY FOR SHIPMENT |
| 3241BAE134862 | 4933333 | C-0003 | -8 | 50 | 3 | C | 2004/12/15 17:21:17 | READY FOR SHIPMENT |
| 3241BAE134880 | 4933333 | C-0003 | 0 | 50 | 3 | C | 2004/12/15 17:21:17 | READY FOR SHIPMENT |

PRODUCT DELIVERY SYSTEM

The present application claims priority from Japanese application serial No. 2009-236796, filed on (Oct. 14, 2009), the content of which is hereby incorporated by reference into this application.

FIELD OF THE INVENTION

The present invention relates to techniques for checking quality conditions of goods including commercial products and commodity products (hereinafter just referred to as products) in delivery through use of sensors, i.e., techniques for checking historical quality conditions such as changes in temperature/humidity and degrees of impact applied to products in delivery through use of sensors. In particular, the present invention relates to a technique for replacement product redelivery to be performed on occurrence of a quality abnormality that is a condition exceeding a specified quality assurance range of a product in the field of physical distribution.

BACKGROUND OF THE INVENTION

Currently, in physical distribution service, most products are transported by delivery trucks specifically arranged for product quality assurance with respect to such conditions as temperature, humidity, and impact during delivery.

Further, instead of conventional shopping wherein customers go to retail shops and bring back purchased products therefrom, Internet shopping is becoming prevalent to cause a significant increase in physical distribution from delivery centers to delivery destinations without customers having to go to real shops for product purchasing.

Under these circumstances, it has been desired to provide further reliable quality assurance for products in delivery due to the need for higher security and safety in physical distribution based on Internet shopping and physical distribution in business-to-business transactions. More specifically, a higher level of reliability in quality assurance has been desired in increasing physical distribution of medical products and frozen foods requiring strict temperature control, clothing items susceptible to humidity, and household electric appliances containing precision devices vulnerable to impact, for example.

In Japanese Unexamined Patent Publication No. 2009-9294, there is disclosed a technique for implementing a product delivery system wherein temperature data is acquired from a temperature sensor attached to each product in delivery, current location data of a delivery truck is acquired through the Global Positioning System (GPS), and based on this data thus acquired, the quality conditions and current location of each product in delivery are indicated in real time to the persons concerned at a delivery source, deliverer location, and delivery destination.

SUMMARY OF THE INVENTION

In the technique disclosed in the Japanese Unexamined Patent Publication No. 2009-9294, although it is possible to acquire information regarding the quality conditions of each product in delivery, a redelivery process for a replacement product is not taken into consideration which is required on detection of a condition exceeding a quality assurance range (temperature, humidity, impact) specified for each product.

Even if the information regarding the quality conditions of each product in delivery is acquired, a replacement product having a characteristic susceptible to occurrence of a quality abnormality may be selected for redelivery, or a storage environment/delivery route that is likely to allow the occurrence of a quality abnormality in a replacement product may be selected for redelivery, thereby resulting in the presence of a tendency to recurrence of a similar quality abnormality. It is to be noted that the term "each product" as used herein signifies a unit to be delivered that includes packing material therefor. That is, even if products per se are identical with each other, the degrees of resistance thereof to environmental changes differ depending on the kind of packing material and the form of packing.

It is therefore an object of the present invention to provide a technique for reducing the likelihood of recurrence of a similar quality abnormality at the time of redelivery of a replacement product.

In solving this object of the present invention and according one aspect thereof, there is provided a technique wherein, when a quality abnormality that is a condition exceeding a quality assurance range (temperature, humidity, impact) specified for each product in delivery is detected through use of a sensor, a replacement product for redelivery is specified as an individual article, information regarding each delivery vehicle having functional characteristics capable of satisfying the specified quality assurance range is proposed, information regarding a delivery vehicle that meets redelivery conditions including an indication of time and date of redelivery, a place of each delivery center, a current location of each delivery vehicle, and environmental conditions is extracted according to the proposed information regarding each delivery vehicle having functional characteristics capable of satisfying the specified quality assurance range, and the extracted information regarding each delivery vehicle is output to indicate a candidate delivery vehicle for redelivering the specified replacement product. The above processing for replacement product selection and delivery vehicle selection is implemented by matching comparison with relevant information stored in a memory apparatus.

In delivery vehicle selection, it is preferable to determine a delivery vehicle through examination of the kind of a detected quality abnormality. In replacement product selection, it is also preferable to determine a replacement product having a characteristic less susceptible to occurrence of a quality abnormality even under the same environmental conditions. This processing for replacement product selection is implemented in a fashion that the characteristics (information indicating the degree of resistance to each kind of quality abnormality) of each product (each individual article or each kind of delivery unit/packing material/packing form) are memorized in advance, and according thereto, a product that is unlikely to incur a particular kind of quality abnormality, i.e., a product having a higher degree of resistance to a particular kind of quality abnormality is specified preferentially.

Further, based on quality abnormality history information acquired in the past, a quality abnormality tendency is figured out with respect to each sensing item corresponding to each product code. Then, stock product data is sorted in relation to abnormality-prone sensing item corresponding to each product code. By using the stock product data thus sorted, the processing for replacement product selection can be carried out at higher speed. This feature is included in the present invention as a preferable aspect thereof.

The present invention also includes the following features. As a precondition, it is assumed that each product under control of a product delivery system according to the present invention has at least one quality assurance range specified by a manufacturer thereof with respect to quality-assurable environmental conditions such as temperature, humidity, and impact to be applied in delivery. A delivery center included in the product delivery system receives each product from the manufacturer thereof. At the time of receipt of each product, in accordance with a principle of quality control for stock in each delivery center, protective packing is provided for the product, and the product with protective packing in a state ready for shipment is stored in a storage room of the delivery center. The principle of quality control for stock may differ from one delivery center to another, i.e., simplified quality control may be implemented in some delivery centers for reduction in cost while strict quality control may be implemented in other delivery centers for ensuring higher reliability for customers.

A sensor device for detecting product quality conditions, which contains a temperature sensor, a humidity sensor, and an impact sensor for example, is attached to a retrievable position on each product to be delivered. Each product having a sensor device attached thereon is placed in a storage room arranged for quality control in each delivery center, e.g., a storage room equipped with a refrigerator/freezer for inside temperature control, a thermo-hygrostat chamber for humidity control, and a shock-absorbing spring device for impact resistance control. Thus, for quality assurance, constant monitoring is performed to acquire information regarding quality conditions of stock products.

Further, on each delivery vehicle such as a delivery truck, there is provided an apparatus for acquiring current location information thereof. Similarly to the delivery center, each product is placed in a storage room arranged for quality control on the delivery vehicle. Thus, for quality assurance during delivery, constant monitoring is performed to acquire information regarding quality conditions of products in the storage room of the delivery vehicle.

Through comparison between the acquired information regarding quality conditions of each product in the delivery center or delivery truck and quality assurance ranges specified for each product, it is checked whether there has occurred a quality abnormality that is a condition exceeding a specified quality assurance range due to a hazardous event, an accident, a failure of the storage room, or the like. If a quality abnormality is found, a replacement product is redelivered in the following manner: On detection of a quality abnormality through use of a sensor attached to each product, information regarding temperature, humidity, or impact corresponding to the sensor-detected quality abnormality (product sensing information) is compared with information regarding temperature, humidity, or impact of each stock product in the delivery center. Based on the result of this comparison, a proper stock product having a characteristic less susceptible to recurrence of a similar quality abnormality is selected. If the cause of a quality abnormality is judged to be a failure of the storage room of the delivery truck through use of an apparatus thereof for detecting quality conditions, a redelivery procedure is taken so as to avoid the use of the faulty storage room of the delivery truck. Further, if a quality abnormality has occurred during delivery, a delivery route where the quality abnormality has been detected is circumvented in redelivery routing according to historical location information and routing information of the delivery truck concerned. Thus, a replacement product is redelivered so as to reduce the likelihood of recurrence of a similar quality abnormality.

In a server of a data center that is coupled to respective data processing points including a delivery center and a delivery truck through a network, there are stored product information regarding product stock quantities and product quality assurance ranges, delivery center information containing addresses of delivery centers, product sensing information regarding stock products in each delivery center, product sensing information regarding products during delivery, and other information/data. In the event of a quality abnormality, according to this information/data, redelivery processing (including replacement product selection and redelivery route selection) is carried out in the server of the data center.

The above and other objects, features and advantages of the present invention will become more apparent from the following detailed description with reference to the accompanying drawings.

As described above and according to the present invention, in a situation where a quality abnormality has occurred during delivery of a product, it is possible to provide the advantageous effect of reducing the likelihood of recurrence of a similar quality abnormality at the time of redelivery of a replacement product.

BRIEF DESCRIPTION OF THE DRAWINGS

FIG. 3 is an explanatory diagram showing an inventory table 213;

FIG. 4 is an explanatory diagram showing a customer master table 214;

FIG. 5 is an explanatory diagram showing a product master table 215;

FIG. 6 is an explanatory diagram showing an individual product information table 216;

FIG. 7 is an explanatory diagram showing a delivery center master table 217;

FIG. 8 is an explanatory diagram showing a delivery center storage room specification master table 218;

FIG. 9 is an explanatory diagram showing a delivery truck master table 219;

FIG. 10 is a delivery truck storage specification master table 220;

FIG. 11 is an explanatory diagram showing a receipt-of-product status table 221;

FIG. 12 is an explanatory diagram showing a shipment-of-product information table 222;

FIG. 13 is an explanatory diagram showing a delivery center storage room status table 223;

FIG. 14 is an explanatory diagram showing a delivery truck storage room status table 224;

FIG. 15 is an explanatory diagram showing a delivery status table 225;

FIG. 16 is a general flowchart of system operation;

FIG. 24 is a flowchart of a delivery truck/delivery center selection step s154 to be taken for redelivery;

FIG. 25 is a flowchart of a redelivery route selection step s155 to be taken for redelivery;

FIG. 28 is an explanatory diagram showing a quality abnormality history table 226;

FIG. 29 is an explanatory diagram showing a receipt-of-product status view 228 to be presented after sorting based on a tendency to occurrence of a quality abnormality;

FIG. 30 is an explanatory diagram showing an arrival-of-product history table 227; and FIG. 31 is an explanatory diagram showing a receipt-of-product status view 229 to be presented after sorting in ascending order of differences between quality conditions of products in receipt and average data of shipment quality conditions of products for which actual deliveries have been completed.

DETAILED DESCRIPTION OF THE PREFERRED EMBODIMENTS

The present invention will now be described in detail by way of example with reference to the accompanying drawings.

Figure 1:
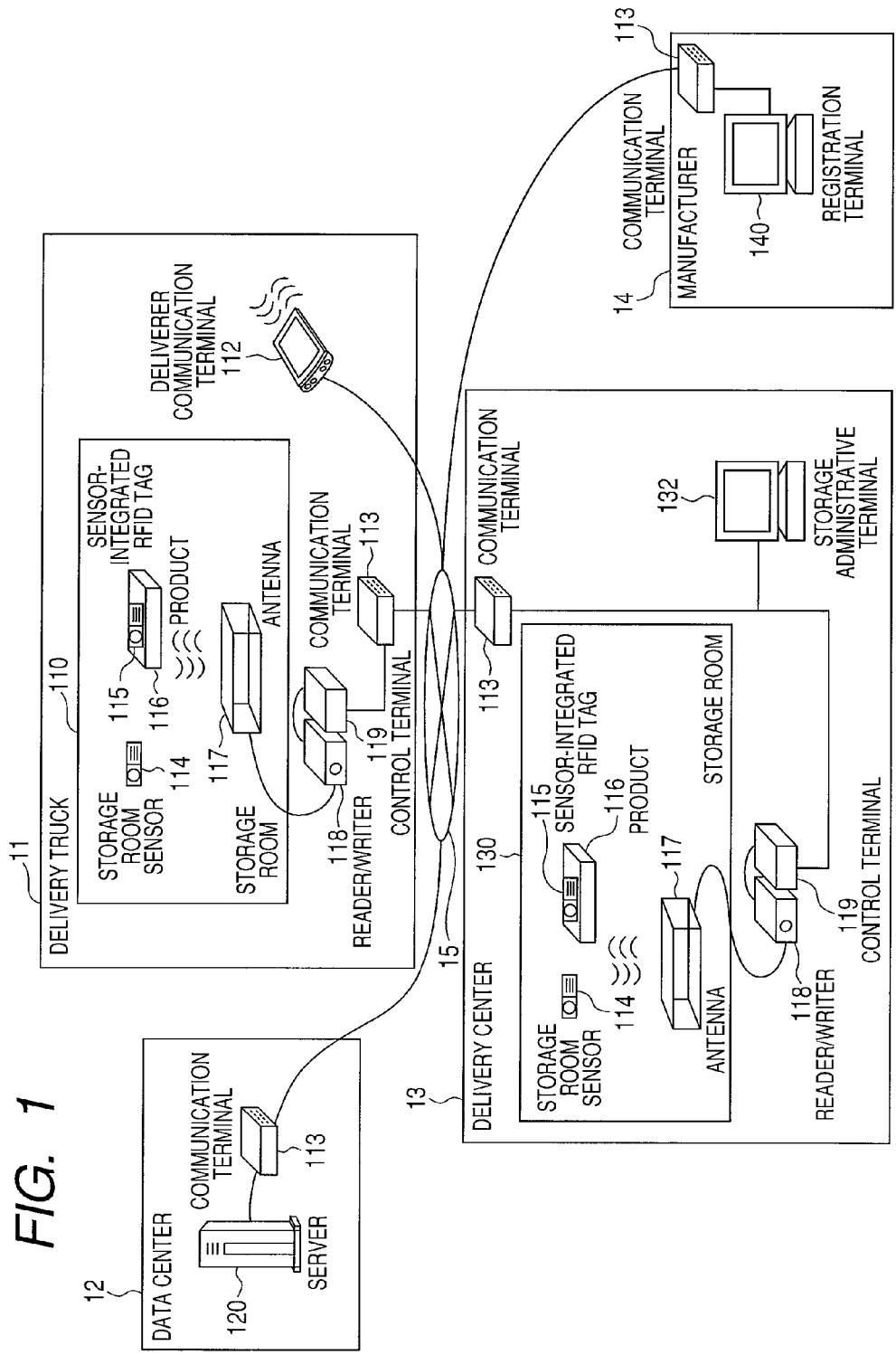
FIG. 1 is a hardware configuration diagram regarding one of the best modes in implementation of the present invention.

Referring to FIG. 1, there is shown a hardware configuration of a product delivery system according to a preferred embodiment of the present invention. In the product delivery system according to the present preferred embodiment, quality conditions of products in delivery are monitored with respect to temperature, humidity, and impact by using sensors, and in case of detection of a quality abnormality, a trouble-countermeasure processing procedure is carried out to reduce the likelihood of recurrence of a similar quality abnormality at the time of redelivery of a replacement product.

Apparatuses included in the product delivery system according to the present preferred embodiment are disposed in the following places of data processing points; a delivery center 13 from which products are delivered, a delivery truck 11 for carrying products, a manufacturer 14 where products are manufactured, and a data center 12. Each of these data processing points is coupled to a network 15. On each product 116 to be handled in the product delivery system according to the present preferred embodiment, a sensor-integrated RFID (radio-frequency identification) tag 115 for detecting product quality conditions such as temperature, humidity, and impact to be applied in delivery is attached at the time of shipment from each manufacturer 14 or at the time of receipt at each delivery center 13.

The apparatuses disposed at each data processing point will be described below.

In the product delivery system according to the present preferred embodiment, there is provided at least one delivery center 13, wherein the following procedures are carried out; a receipt procedure for receiving products from each manufacturer 14 thereof, an inventory control procedure for managing stock products, an acceptance procedure for accepting delivery requests from customers, and a delivery procedure for handing over object products to each delivery truck 11. In the delivery center 13, at least one storage room 130 is installed as a facility for storing products. The storage room 130 is equipped with a storage room sensor 114 for detecting storage quality conditions such as inside temperature, humidity, and impact to be applied to products in custody. Further, in the delivery center 13, a storage administrative terminal 132 is provided for making reference to information regarding acceptance of product delivery requests from customers, for registering product information at the time of receipt of products, and for receiving e-mails from a server 120 installed in the data center 12. Quality conditions of products and storage states thereof in the storage room 130 are acquired through communication by radio waves. In this regard, there are installed an antenna 117 for radio wave communication with each sensor, a reader/writer 118 for converting radio waves received by the antenna 117 into electrical information, and a control terminal 119 used for controlling the reader/writer 118. Information concerning product quality conditions and storage states acquired through use of these apparatuses is transmitted to the data center 12 via a communication terminal 113.

In the product delivery system according to the present preferred embodiment, there is provided at least one delivery truck 11, which carries products 116 loaded thereon at the delivery center 13 to each delivery destination. On the delivery truck 11, at least one storage room 110 is installed for storing products 116. The storage room 110 of the delivery truck 11 is equipped with a refrigerator/freezer and a shock-absorbing device using springs or the like as required for keeping product quality with respect to temperature, humidity, and impact. Further, the storage room 110 is equipped with a storage room sensor 114 for detecting storage quality conditions of products therein. Similarly to the case of the delivery center 13, quality conditions of products and storage states thereof in the storage room 110 are acquired through communication by radio waves. In this regard, there are installed an antenna 117 for radio wave communication with each sensor, a reader/writer 118 for converting radio waves received by the antenna 117 into electrical information, and a control terminal 119 used for controlling the reader/writer 118. Information concerning product quality conditions and storage states acquired through use of these apparatuses is transmitted to the data center 12 via a communication terminal 113. In addition, the delivery truck 11 is provided with a deliverer communication terminal 112 for a driver thereof to receive messages such as notifications of redelivery requests from the data center 12 or a deliverer communication terminal 112 including GPS functions that is available also for acquiring current location information of the delivery truck 11.

In the product delivery system according to the present preferred embodiment, there is included a least one manufacturer 14 where products 116 related to the present preferred embodiment are manufactured. In the manufacturer 14, a registration terminal 140 is installed for registering product quality assurance ranges (to be described in detail later). Information registered at the registration terminal 140 is transmitted to the data center 12 via a communication terminal 113 through the network 15. The server 120 installed in the data center 12 is coupled to the network 15 via a communication terminal 113 for collecting and managing information from apparatuses at respective data processing points of the product delivery system. As required, the server 120 creates necessary delivery-related information and transmits the information to each apparatus.

Figure 2:
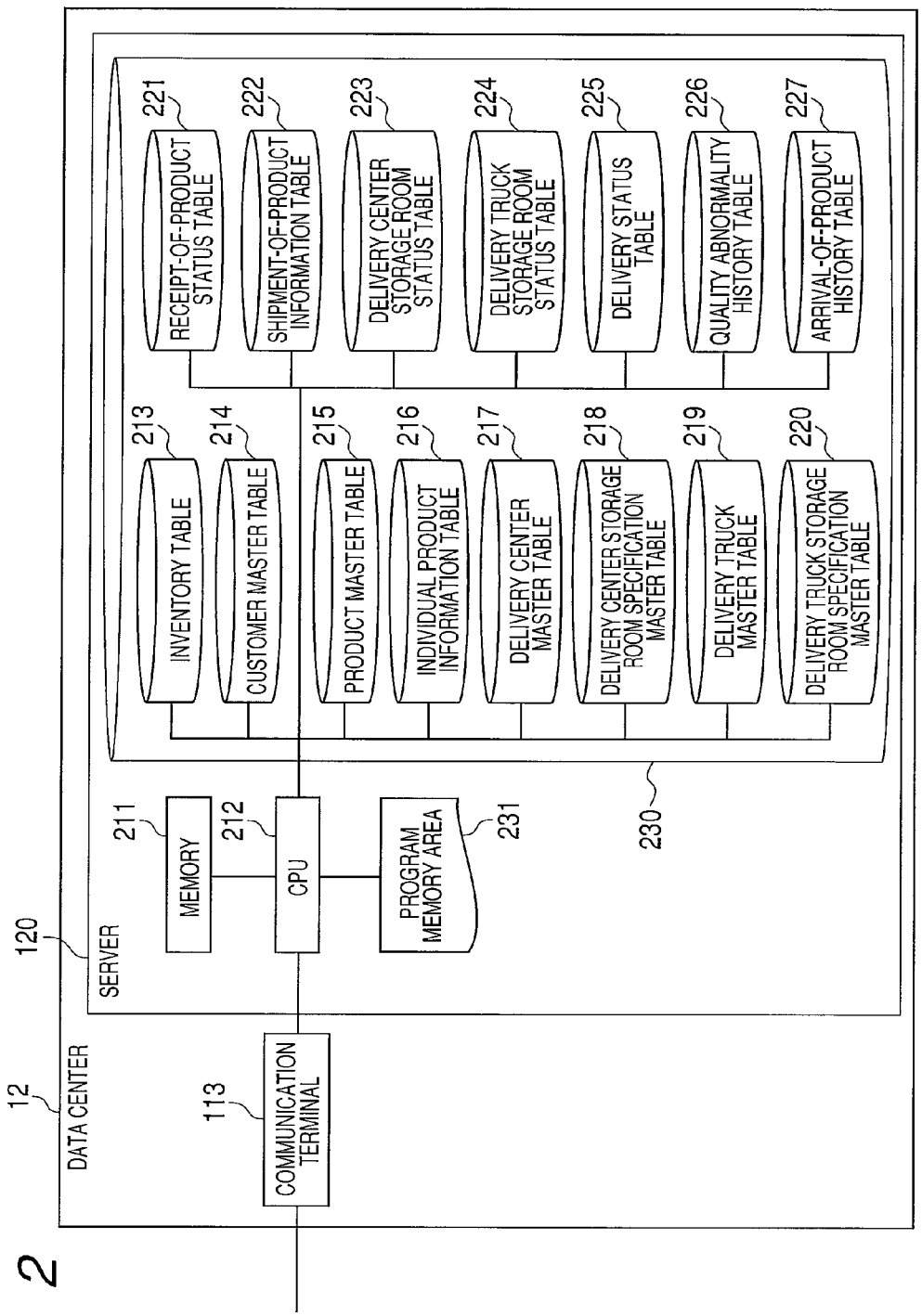
FIG. 2 is a configuration diagram of a data center.

Referring to FIG. 2, there is shown a configuration of the data center 12. The server 120 includes a CPU 212 for carrying out product delivery data processing related to the present preferred embodiment, a memory 211 for temporarily storing data to be processed by the CPU 212, a database 230 including a group of tables for storing and managing information collected from respective data processing points (to be described below), and a program memory area 231.

In the database 230, the following tables are included: an inventory table 213 for holding inventory information of products in the delivery center 13, a customer master table 214 for holding information regarding customers corresponding to destinations of product delivery, a product master table 215 for holding information regarding product quality assurance ranges, an individual product information table 216 for managing correspondence relationships between individual products and product codes, a delivery center master table 217 for holding information regarding each delivery center 13 where products to be delivered are stored, a delivery center storage room specification master table 218 for registering storage room specifications of each delivery center 13, a delivery truck master table 219 for holding information regarding each delivery truck 11, a delivery truck storage room specification master table 220 for registering storage room specifications of each delivery truck 11, a receipt-of-product status table 221 for holding information regarding receipt of products at each delivery center 13 and quality conditions of products stored therein, a shipment-of-product information table 222 for holding information regarding shipment of products to be loaded onto each delivery truck 11 in response to delivery requests from customers, a delivery center storage room status table 223 for registering conditions of each delivery center storage room 130 in a time-series sequence, a delivery truck storage room status table 224 for holding information regarding each delivery truck storage room 110 set in the delivery truck 11, a delivery status table 225 for registering quality conditions of products during delivery, a quality abnormality history table 226 for registering quality conditions in case of detection of a quality abnormality in products during delivery, and an arrival-of-product history table 227 for registering shipment quality conditions of products that have arrived at delivery destinations thereof. The program memory area 231 is used to store programs for processing data transmitted to the server 120, i.e., in the server 120. The data transmitted to the server is processed under the direction of programs stored in the program memory area 231.

With reference to FIGS. 3 to 15, the following describes exemplary configurations of the tables mentioned above.

The inventory table 213 shown in FIG. 3 is used for registering the stock quantity corresponding to each product code specified to indicate an identical kind of product in each delivery center. A value of stock quantity registered in the inventory table 213 is updated according to an increase or decrease in stock. The inventory table 213 contains the entry items of delivery center ID 400, product code 401, and stock quantity 402.

The customer master table 214 shown in FIG. 4 is used for registering information regarding customers at the time of request for product delivery. When a quality abnormality is detected in a product to be delivered to a destination thereof, the server 120 provides relevant notification to the customer according to the customer master table 214. The customer master table 214 contains the entry items of customer ID 410 for uniquely identifying each customer, customer name 411, and e-mail address 412 for notification to each customer.

The product master table 215 shown in FIG. 5 is used for registering information regarding quality assurance ranges of each kind of product from respective manufacturers 14. A quality assurance range is specified for each kind of product, and record data is provided for each product code. The product master table 215 contains the entry items of product code 420, product name 421, manufacturer name 422 representing a registrant of each product quality assurance range, temperature 423, humidity 424, and impact 425 (quality assurance ranges are indicated by the entry items of temperature, humidity, and impact). In a case where "0-30" is indicated as a quality assurance range, the quality of the product concerned is assured within a conditional range of 0 to 30. In a case where "below 0" is indicated as a quality assurance range, the quality of the product concerted is assured at a level below 0.

The individual product information table 216 shown in FIG. 6 is used for managing individual products according product tag information. The individual product information table 216 contains the entry items of product tag ID 430 for indicating each ID code such as an RFID assigned to each product, and product code 431 for indicating a kind of individual product.

The delivery center master table 217 shown in FIG. 7 is used for managing information regarding each delivery center 13. The delivery center master table 217 contains the following entry items: a delivery center ID 440 for indicating an ID code of each delivery center, a delivery center name 441 for indicating the name of each delivery center, an address 442 for indicating the address of each delivery center, and operating hours 443 for indicating hours of operation in each delivery center. For example, in the entry item of operating hours, "6-18" indicates that the delivery center concerned is open from 6:00 a.m. to 6:00 p.m., and "0-24" indicates that the delivery center concerned is open on a 24-hour basis. In addition to these entry items, the delivery center master table 217 also contains the entry item of e-mail address 444 for indicating an e-mail address of the administrator of each delivery center for communication thereto.

The delivery center storage room specification master table 218 shown in FIG. 8 is used for registering information regarding specifications of each storage room 130 in each delivery center 13. The delivery center storage room specification master table 218 contains the following entry items: a delivery center ID 450, a storage room ID 451 for indicating an ID code of each storage room in each delivery center, and temperature 452 and humidity 453 for indicating a quality-assurable range for each sensing item of each storage room. In a case where "–30-0" indicated as a value range of temperature 452, quality assurance is allowed in a temperature range of –30° C. to 0° C. Similarly, in a case where "30-60" is indicated as a value range of humidity 453, quality assurance is allowed in a humidity range of 30% to 60%. By using a combination of a delivery truck ID code and a storage room ID code, it is possible to identify a storage room uniquely.

The delivery truck master table 219 shown in FIG. 9 is used for managing information regarding each delivery truck. The delivery truck master table 219 contains the following entry items: a delivery truck ID 460 for indicating an ID code of each delivery truck, a delivery truck name 461, a current location 462 for indicating the location of each delivery truck at the current point of time, and an e-mail address 463 for indicating an e-mail address of the deliverer concerned for communication thereto. The entry item of current location 462 indicates location information that varies constantly during delivery. For the sake of simplicity in description of the present preferred embodiment, current location information of each delivery truck is included in the delivery truck master table 219. There may also be provided such a separate transaction table that contains an ID code of each delivery truck, current location information thereof, and time and date indication associated therewith.

The delivery truck storage room specification master table 220 shown in FIG. 10 is used for registering information regarding specifications of a storage room 110 of each delivery truck 11. Similarly to the delivery center storage specification master table 218, the delivery truck storage room specification master table 220 contains the following entry items: a delivery truck ID 470, a storage room ID 471 for indicating an ID code of each storage room 110 of each delivery truck, and temperature 472, humidity 473, and impact 474 for indicating a quality-assurable range for each sensing item of each storage room 110.

The receipt-of-product status table 221 shown in FIG. 11 is used for registering conditions of products received at each delivery center 13. The receipt-of-product status table 221 contains the following entry items: a product tag ID 480 for managing individual products by using a sensor-integrated RFID tag attached to each product, a delivery center ID 481, and temperature 482, humidity 483, and impact 484 for registering data values indicated by a sensor attached to each product. In the entry items of temperature 482, humidity 483, and impact 484, sensor data values are updated at predetermined intervals during a period from a receipt-of-product point of time until a shipment-of-product point of time. In the entry item of packing level 485, a packing level code is registered to indicate a level of resistance to impact corresponding to shock-absorbing packing materials required for product delivery. For example, the packing level codes of "C", "B", "A", and "S" are used. The packing level code "C" is indicated in the case of non-requirement for shock-absorbing materials, the packing level code "B" is indicated in the case of requirement for cardboard packing, the packing level code "A" is indicated in the case of requirement for cardboard packing and internal shock-absorbing materials, and the packing level code "S" is indicated in the case of requirement for cardboard packing, internal shock-absorbing materials, and external shock-absorbing materials. In addition to the entry items mentioned above, the receipt-of-product status table 221 also contains the entry items of time and date 486 and product status 487. In the entry item of time and date 486, the date and time of information registration in the table are indicated. In the entry item of product status 487, the entries of "Received", "Ready for shipment", "In preparation", and "Shipped" are used. The product status entry "Received" is indicated when the product concerned is received, the product status entry "Ready for shipment" is indicated when the product is concerned is in a wait state for a delivery request from a customer after receipt of the product, the product status entry "In preparation" is indicated when a delivery request from a customer is accepted, and the product status entry "Shipped" is indicated when actual delivery of the product concerned is started.

The shipment-of-product information table 222 shown in FIG. 12 is used for managing information regarding products to be shipped. Upon determination of the delivery of the product concerned, entries are made thereinto. The shipment-of-product information table 222 contains the following entry items: a product tag ID 490, a customer ID 491 for indicating an ID code of the customer concerned according to the customer master table 214, a delivery destination 492 for indicating a destination requested by the customer, and a delivery truck ID 493 for indicating a truck that delivers the product concerned.

The delivery center storage room status table 223 shown in FIG. 13 is used for registering conditions of each storage room 130 in each delivery center 13. The delivery center storage room status table 223 contains the following entry items: a delivery center ID 500, a storage room ID 501, storage room temperature 502, humidity 503, impact 504, and time and date 505 for indicating the date and time of product sensing.

The delivery truck storage room status table 224 shown in FIG. 14 is used for registering conditions of each storage room 110 of each delivery truck 11 similarly to the delivery center storage room status table 223. The delivery truck storage room status table 224 contains the following entry items: a delivery truck ID 510, a storage room ID 511, storage room temperature 512, humidity 513, impact 514, and time and date 515 for indicating the date and time of product sensing.

The delivery status table 225 shown in FIG. 15 is used for registering, in a time-series sequence, product sensing information during delivery by the delivery truck 11. According to data indicated in the delivery status table 225, a comparative check is performed to determine whether the quality assurance range concerned is satisfied or not. The delivery status table 225 containing the following entry items: a product tag ID 520, temperature 522, humidity 523, impact 524 (product sensing information including temperature, humidity, and impact values indicated by a sensor attached to each product), a delivery state 525 for indicating a product delivery state at the point of time of product sensing, and time and date 526 for indicate the date and time of product sensing. In the entry item of delivery state 525, the entries of "In delivery", "Abnormal", and "Arrived" are used. The delivery state entry "In delivery" is indicated when the product concerned is during delivery, the delivery state entry "Abnormal" is indicated when a quality abnormality is detected in the product concerned, and the delivery state entry "Arrived" is indicated when actual delivery of the product concerned to a destination thereof is completed.

The following describes processing operations to be performed in the product delivery system according to the present preferred embodiment.

First, preparative processing operations in the product delivery system according to the present preferred embodiment are described below. In master data registration for registering data into each master table in the product delivery system, delivery truck information is entered through the storage administrative terminal 132 in each delivery center at a preparative step for introducing delivery trucks. More specifically, in the delivery truck master table 219 held in the server 120, a delivery truck ID code, a delivery truck name, a current location thereof, and an e-mail address thereof are registered. In the delivery truck storage room specification master table 220, storage room specifications regarding temperature, humidity and impact are registered as relevant storage room record data. On completion of the above-mentioned registration, the server 120 issues a completion-of-registration message for display thereof on the storage administrative terminal 132 in each delivery center. Current location data 462 to be entered in the delivery truck master table 219 is acquired from each deliverer communication terminal. In a situation where each delivery truck is not yet in delivery operation, the current location thereof cannot be acquired. Hence, when each delivery truck is not yet in delivery operation, information indicating a non-operation condition is registered into the delivery truck master table 219. When each delivery truck is in delivery operation, the latest information indicating the current location thereof is registered for updating in the delivery truck master table 219. In a case where a new delivery truck is introduced additionally, relevant information thereof is added as new record data to the delivery truck master table 219 and the delivery truck storage room specification master table 220. For updating delivery truck information, relevant record data values are updated in these tables. When each delivery truck is put into service, the storage room sensor 114, antenna 117, reader/writer 118, and control terminal 119 are made active.

Then, at a preparative step for each delivery center, information regarding each delivery center is registered in a manner similar to that in the preparative step for introducing delivery trucks. In the delivery center master table 217 included in the database 230 of the data center 12, a delivery center ID, a delivery center name, a delivery center address, a period of operating hours, and a delivery center e-mail address are registered. In the delivery center storage room specification master table 218, storage room specifications regarding temperature and humidity are registered as relevant storage room record data. Upon normal completion of the above-mentioned registration, a completion-of-registration message is displayed on the storage administrative terminal 132. If the above-mentioned registration is not completed normally due to improper input or the like, a failure-in-registration message is displayed on the storage administrative terminal 132. Further, temperature, humidity, and impact values acquired through the storage room sensor 114 in each storage room of each delivery center are registered as data into the entry items of temperature 502, humidity 503, and impact 504 of the delivery center storage room status table 223. Further, from the delivery center storage room specification master table 218, the sensing item specifications regarding temperature 452 and humidity 453 are acquired and compared with the temperature and humidity values acquired through the storage room sensor in each storage room of each delivery center to check whether each storage room of each delivery center is normal in operation. Thus, judgment is made on whether each storage room of each delivery center is operative properly or not. When each delivery center is put into service, the storage room sensor thereof and other apparatuses are made active as in the case of the preparative step for introducing delivery trucks.

In a situation where a manufacturer 14 puts on sale a new kind of product to be delivered through the product delivery system according to the present preferred embodiment, quality assurance ranges of the new kind of product are determined and registered additionally at a preparative step for introducing the new kind of product. More specifically, in the product master table 215, a product code, a product name, a manufacturer name, and quality assurance ranges regarding temperature, humidity, and impact are entered for registration through the registration terminal 140 installed in the manufacturer 14. On completion of the above registration, the server 120 issues a completion-of-registration message to the registration terminal 140.

With reference to FIG. 16, the following describes the general flow of logistic activities in the product delivery system according to the present preferred embodiment.

As shown in FIG. 16, the general flow includes procedural steps s10 to s18. In a receipt-of-product procedural step s10, when products are received at each delivery center, each product is packed and a sensor is attached to an outer case thereof. Then, the product is placed in a proper storage room, and relevant receipt-of-product information is registered into the database 230. In an acceptance-of-delivery-request procedural step s11, a delivery request from a customer is registered. In a delivery procedural step s12, shipment information is registered into the database 230. In an abnormality judgment procedural step s13, quality conditions of each product in delivery are checked constantly through product sensing, and relevant data is registered into the server for judging whether the quality of each product is abnormal or not. In a branching procedural step s14, a branching operation is performed according to the result of quality abnormality judgment. In a preparation-for-redelivery procedural step s15, an optimal stock product, delivery center, delivery truck storage room, delivery truck and delivery route are selected for redelivery. In a redelivery procedural step s16, a redelivery operation is performed according to conditions selected in the preparation-for-redelivery procedural step. In a branching procedural step s17, judgment is made on whether the product concerned has arrived at the delivery destination thereof. In an arrival-of-product procedural step s18, the product concerned is received at the delivery destination thereof. If, in the abnormality judgment procedural step s13, no quality abnormality is detected until arrival at the delivery destination concerned, a transition is made to the arrival-of-product procedural step s18 without performing the preparation-for-redelivery procedural step s15 and the redelivery procedural step s16. In a case where redelivery is performed after detection of a quality abnormality, the abnormality judgment procedural step s13 is also carried out in the same manner as in normal delivery.

The details of each processing procedural step included in the general flow shown in FIG. 16 are described below.

Figure 17:
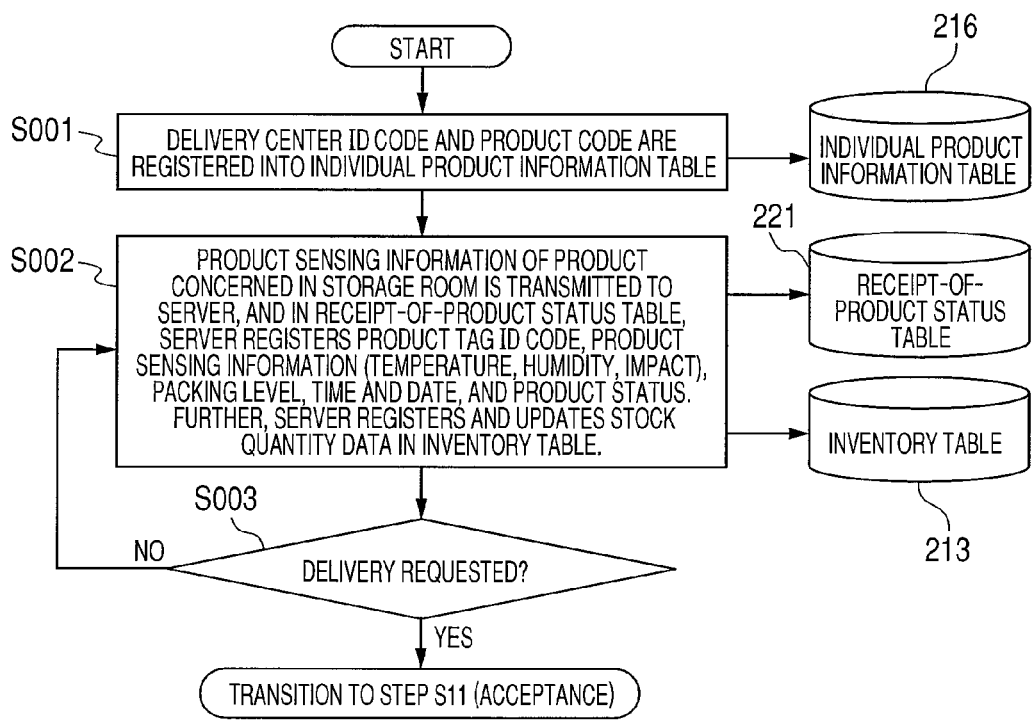
FIG. 17 is a flowchart of a receipt-of-product procedural step s10.

With reference to FIG. 17, the following describes the details of the receipt-of-product procedural step s10 which is the initial processing step of logistic activities in the product delivery system according to the present preferred embodiment. As preconditions, it is assumed here that, after the delivery center 13 receives an ordered quantity of products from the manufacturer 14, each of the products received is packed, and a sensor-integrated RFID tag 115 in a powered-on state is attached thereto according to a principle of quality control in the delivery center. Then, each product is placed in the storage room 130 of the delivery center 13. In processing at step s001 for indicating receipt-of-product information in management of individual products, a product tag ID and a product code are additionally registered into the individual product information table 216 through the storage administrative terminal 132 of the delivery center. On completion of the above registration, the server 120 issues a completion-of-registration message to the storage administrative terminal 132. Then, in processing at step s002, information acquired through product sensing operations repeated at predetermined intervals by the sensor (RFID tag) attached to each product is registered into the receipt-of-product status table 221. More specifically, a product tag ID code, a temperature value, a humidity value, an impact value, a packing level, and an indication of time and date of product sensing are registered into the receipt-of-product status table 221. Further, in the case of the first registration of the product concerned, the product status entry "Received" is registered into the receipt-of-product status table 221. Alternatively, in the case of the second or subsequent registration, the product status entry "Ready for shipment" is registered thereinto. Thus, the registration into the receipt-of-product status table 221 is completed. On an each-time basis of completion of the above registration, the server 120 issues a completion-of-registration message to the storage administrative terminal 132. Regarding a product for which the product status entry "Ready for shipment" is indicated for the first time, the product code concerned is acquired from the product master table 215 by using the product tag ID code thereof as key information. From the receipt-of-product status table 221, the delivery center ID code concerned is acquired as delivery center information. Then, according to the product code and the delivery center ID code thus acquired, a stock quantity value for each delivery center and for each product code is registered into the inventory table 213 for updating inventory data.

Further, until a request for delivery is received, a product sensing operation and judgment step s003 are repeated. Then, upon receipt of a request for delivery, a transition is made to the acceptance-of-delivery-request procedural step s11.

Figure 18:
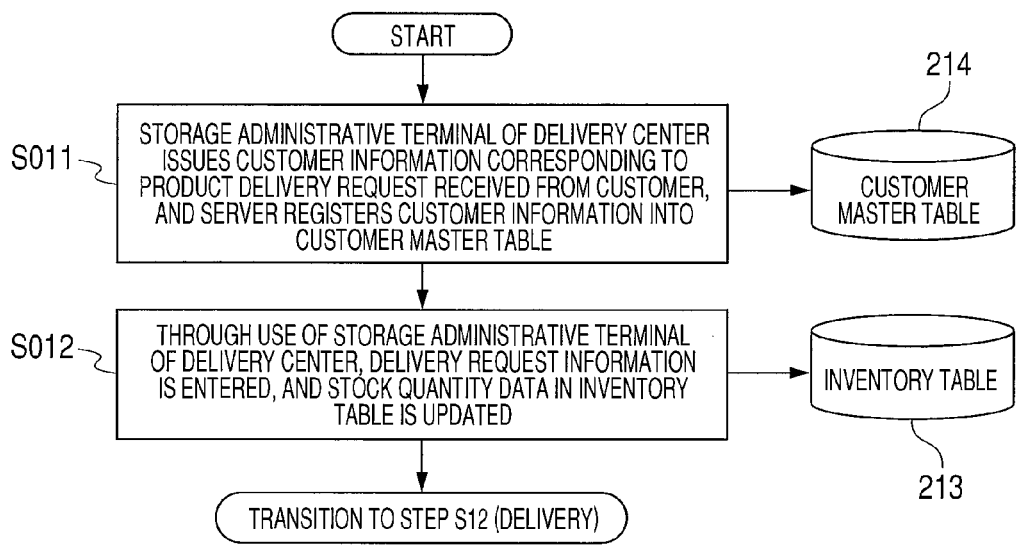
FIG. 18 is a flowchart of an acceptance-of-delivery-request procedural step s11.

With reference to FIG. 18, the following describes the details of the acceptance-of-delivery-request procedural step s11. In processing at step s011, as information regarding a delivery request from a customer, a customer name, an e-mail address thereof, a product name or product code corresponding to the delivery request, and a delivery destination are held for acceptance in the storage administrative terminal 132. Along with a customer ID code for customer identification, the customer name and the e-mail address thereof that have been held for acceptance in the storage administrative terminal 132 are registered into the customer master table 214 held in the server 120. At this step of processing, the above registration is not made if the customer information concerned has already been registered in the customer master table 214. Then, in processing at step s012, using the delivery center ID code concerned and the product code concerned as key information, a search is performed in the inventory table 213. In the inventory table 213, the number of products to be delivered is subtracted from the stock quantity value concerned. In the receipt-of-product status table 221, a product tag ID code, a temperature value, a humidity value, an impact value, a packing level, an indication of time and date of registration, and "In preparation" as a product status entry are registered. On completion of the above registration, the server 120 issues a completion-of-registration message to the storage administrative terminal 132. Then, a transition is made to the delivery procedural step s12. At the time of acceptance processing, a delivery center operator makes reference to the inventory table 213. If it is found that the product concerned is not in stock, a relevant notification is sent to the customer to stop the acceptance processing. In this case, for example, an error message is issued to terminate the acceptance processing or a prompting message for a retry of input is issued.

Figure 19:
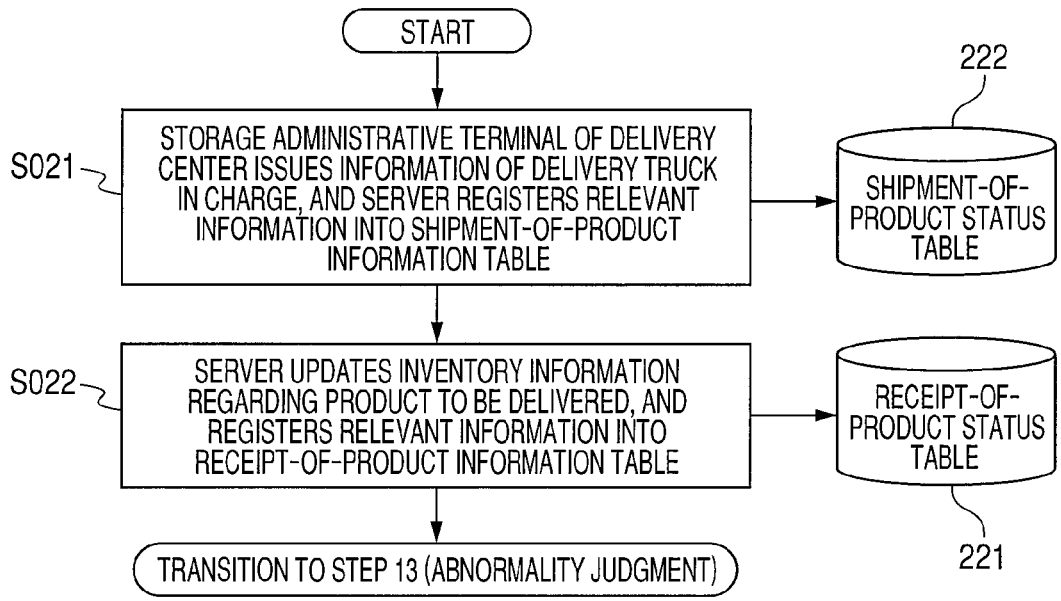
FIG. 19 is a flowchart of a delivery procedural step s12.

With reference to FIG. 19, the following describes the details of the delivery procedural step s12. In processing at step s021, a sort operation is performed for each delivery destination, and information linkage is set up between each product 116 and a delivery truck 11 in charge of delivery thereof. From the storage administrative terminal 132, a product tag ID code, a customer ID code, a delivery destination, and a truck ID code are registered into the shipment-of-product information table 222 in the server 120. A delivery center worker carries the product concerned from the storage room 130 of the delivery center to the storage room 110 of the delivery truck in charge of delivery thereof. At the control terminal 119 installed in the storage room 110 of the delivery truck, a sensor-integrated RFID tag 115 attached to the product concerned is read out through the reader/writer 118 and the antenna 117 so that product sensing information indicating the quality conditions of the product concerned can be acquired. Further, the delivery destination concerned is registered into a delivery route selection system for delivery according to a route indicated through calculation therein. In processing at step s022, information regarding a transition of the product concerned from a received state to a shipment state is registered. In the receipt-of-product status table 221, a product tag ID code, a temperature value, a humidity value, an impact value, a packing level, an indication of time and date of shipment registration, and "Shipped" as a product status entry are registered. On completion of the above registration, the server 120 issues a completion-of-registration to the storage administrative terminal 132. Actual delivery is started according to a specified schedule so that products will be delivered collectively in certain quantities as in common practice of logistic operation. Then, a transition is made to the abnormality judgment procedural step s13.

Figure 20:
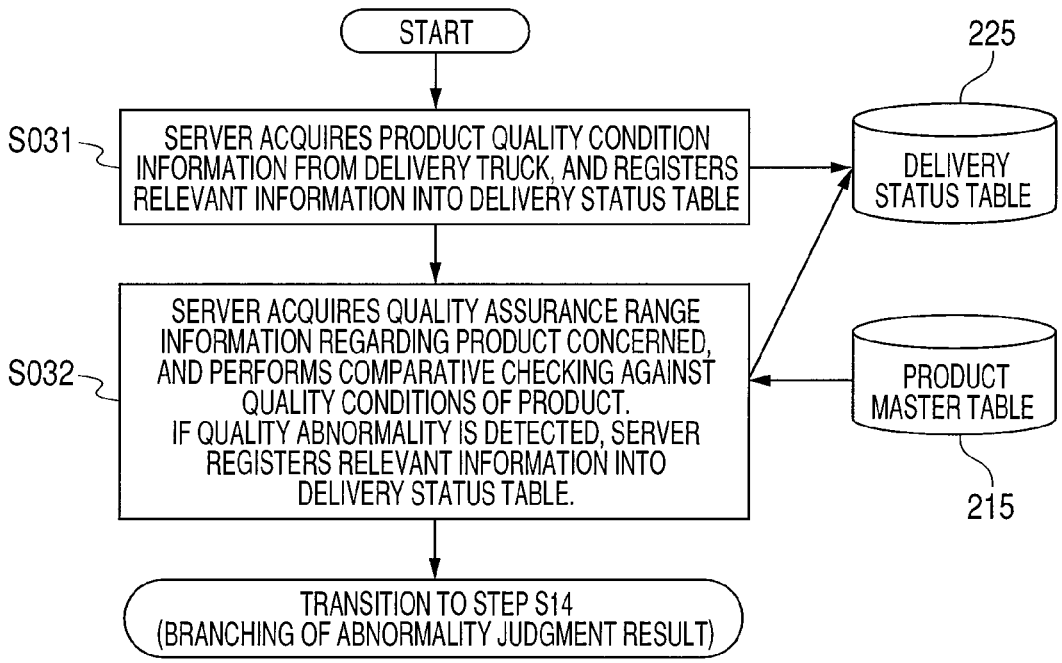
FIG. 20 is a flowchart of an abnormality judgment procedural step s13 for checking whether the quality of any product in delivery is abnormal.

With reference to FIG. 20, the following describes the details of the abnormality judgment procedural step s13 for checking whether the quality of any product in delivery is abnormal. In processing at step s031, the quality conditions of each product during actual delivery service and the current location information indicated from the deliverer communication terminal 112 are acquired repeatedly at predetermined intervals. As information regarding the delivery concerned, a product tag ID code, a temperature value, a humidity value, an impact value, a delivery state, and an indication of time and date of product sensing are registered into the delivery status table 225 held in the server 120. For indicating the latest location information of the delivery truck, the current location thereof is registered into the delivery truck master table 219 so as to update information indicated at the entry item of current location 462 therein. In processing at step s032, using a registered product tag ID code as key information, the server 120 acquires a quality assurance range stored in the product master table 215, and performs a comparative check against the product sensing information concerned. If the quality assurance range is exceeded, the quality conditions at the time point of quality abnormality detection are registered as new record data into the delivery status table 225, and also "Abnormal" is registered in the entry item of delivery state 525 in the delivery status table 225. Thereafter, regarding the product that has been detected to be abnormal in quality, product sensing information to be acquired at predetermined intervals is not registered into the delivery status table 225. Data entries indicated at the time point of quality abnormality detection, including the product tag ID code, temperature value, humidity value, impact value, delivery state, time and date of product sensing, and current location, are held in the memory 211. In contrast, when the quality assurance range is not exceeded, a completion-of-registration message regarding product sensing information during delivery is issued to the control terminal 119 of the delivery truck concerned.

In the branching procedural step s14, a branching operation is performed according to the result of quality abnormality judgment. If a quality abnormality is detected, a transition is made to the preparation-for-redelivery procedural step s15 to be described in detail below. If no quality abnormality is detected, a transition is made to the branching procedural step s17 wherein judgment is made on whether the product concerned has arrived at the delivery destination thereof, which will be described in detail later.

Figure 21:
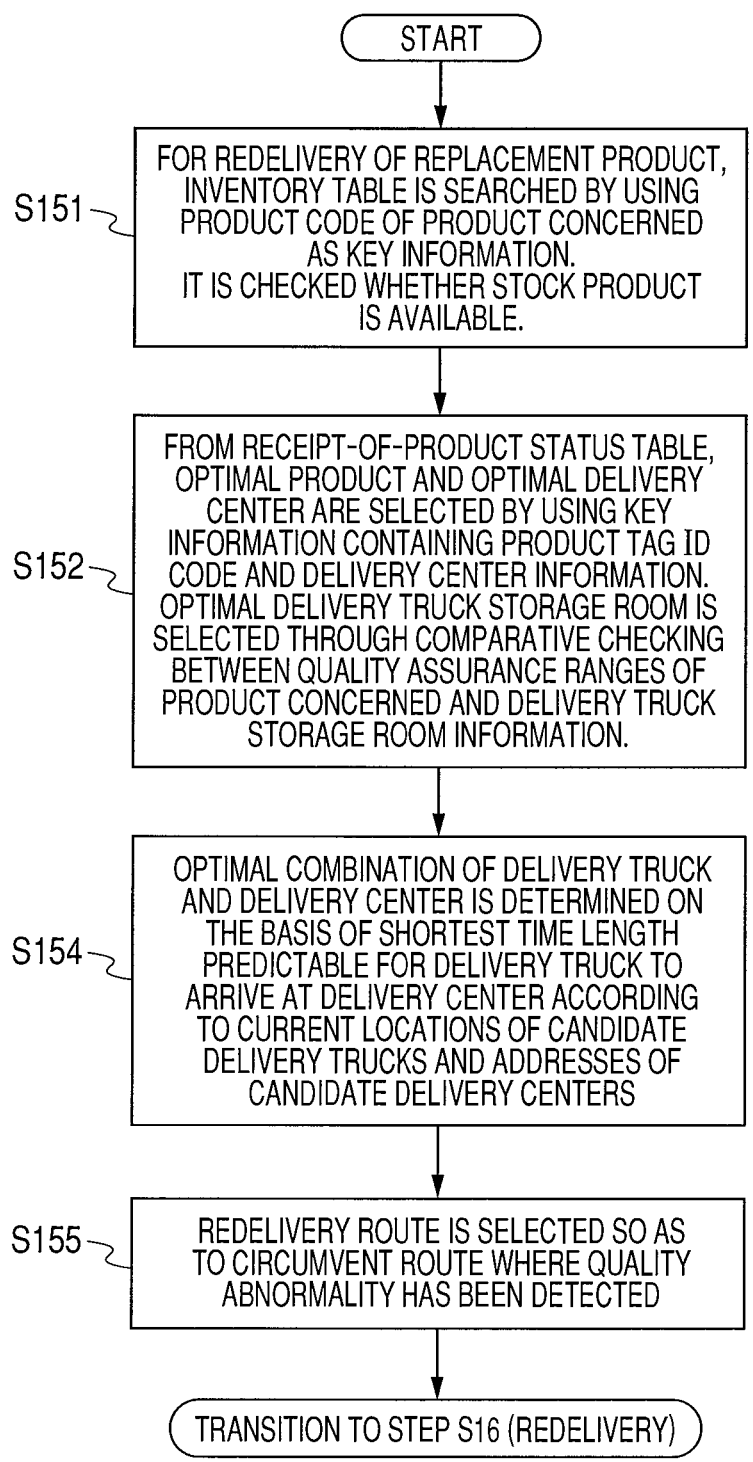
FIG. 21 is a flowchart of a preparation-for-redelivery procedural step s15 to be taken on detection of a quality abnormality.

With reference to FIG. 21, the following describes the details of the preparation-for-redelivery procedural step s15 wherein, as a countermeasure against a detected quality abnormality, a redelivery process less susceptible to recurrence of a similar quality abnormality is selected.

In the processing flow of the preparation-for-redelivery procedural step s15, there are included an inventory check step s151, a product/delivery truck storage room selection step s152, a delivery truck/delivery center selection step s154, and a redelivery route selection step s155. In the inventory check step s151, it is judged whether a replacement product is available or not. In the product/delivery truck storage room selection step s152, a replacement product for redelivery is selected from stock as required, and a proper delivery truck storage room is selected which is capable of setting conditions satisfying the quality assurance ranges specified for the product concerned. In the delivery truck/delivery center selection step s154, an optimal combination of a proper delivery truck available and a proper delivery center is selected. In the redelivery route selection step s155, an optimal route for redelivery is selected. The details of these steps are described below. Thereafter, a transition is made to the redelivery procedural step s16. The preparation-for-redelivery procedural step s15 and the redelivery procedural step s16 are performed in the event that a quality abnormality is recognized in abnormality judgment.

The following describes the details of the inventory check step s151 in the processing of preparation for redelivery.

Figure 22:
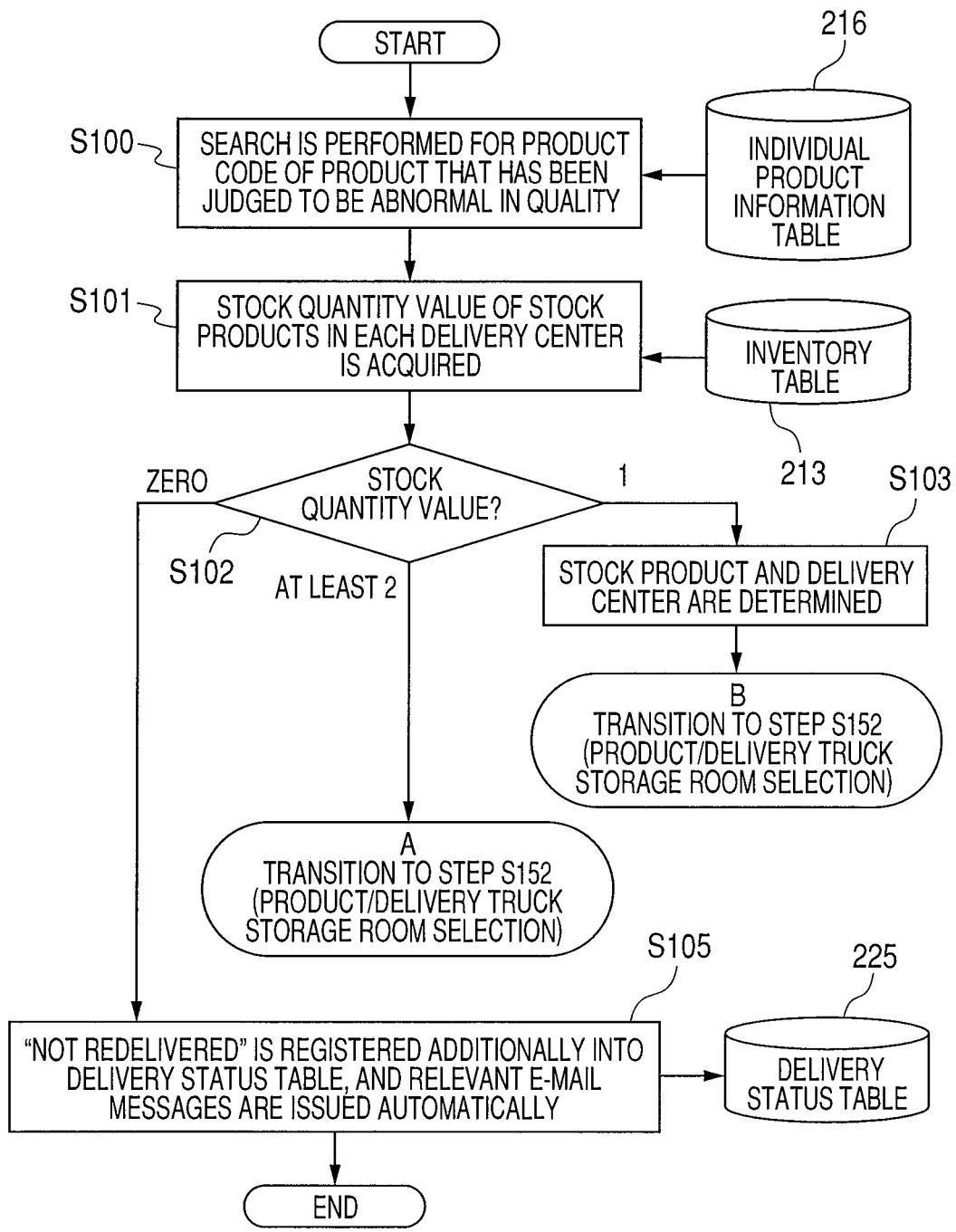
FIG. 22 is a flowchart of an inventory check step s151 to be taken for redelivery.

As shown in FIG. 22, step s100 is performed on detection of a quality abnormality in a product during delivery. At step s100, using key information containing a product tag ID code of the product that has been detected to be abnormal in quality, the server 120 searches the individual product information table 216 to acquire a product code of a replacement product for redelivery processing. Then, at step s101, using the product code thus acquired as key information, the server 120 searches the inventory table 213 to check whether the product concerned is in stock or not. Further, through comparative checking between a time period to be taken for preparation for product redelivery and a time period of operating hours of each delivery center, it is checked whether any proper delivery center in operation is selectable. At step s102, a conditional branching operation is performed according to the stock quantity concerned.

The conditional branching operation at step s102 is described below. In a case where the stock quantity value is "zero", a transition is made to step s105. In a case where the stock quantity value is "1", a transition is made to step s103. In a case where the stock quantity value is at least "2", a transition is made to step s152-A (product/delivery truck storage room selection step) for selecting a replacement product for redelivery, a proper delivery center, and a proper delivery truck storage room. In processing at step s103, a replacement product for redelivery and a proper delivery center are determined, and a product decision flag and a delivery center decision flag are set up. Then, a transition is made to step s152-B (product/delivery truck storage room selection step) for selecting a proper delivery truck storage room. In processing at step s105, the unavailability of a proper replacement product for redelivery is indicated, and the subsequent preparation-for-redelivery processing is not performed. Further, in this case, as additional information regarding the product concerned, "Not redelivered" is registered in the entry item of delivery state 525 of the delivery status table 225. In addition, relevant e-mail messages to be described later are issued, and the preparation-for-redelivery processing is terminated.

For example, in a situation where a product corresponding to the entry item of product tag ID 520 "3241BAE134328" in the delivery status table 225 is judged to be abnormal in quality, a search is performed in the individual product information table 216 by using "3241BAE134328" as key information. Thus, the product code "49442423" can be acquired. Then, using the product code "49442423" thus acquired as key information, a search is performed in the inventory table 213. In the result of the above search, it is found that a stock quantity value of "1" is indicated for each of the delivery center ID codes "C-0001" and "C-0002", i.e., a total stock quantity value of "2" is acquired. Through examination of the time of quality abnormality detection "17:23" indicated in the delivery status table 225 with reference to the entry item of operating hours 443 in the delivery center master table 217, it is judged that the periods of operating hours of the delivery centers concerned are adequate for this case. That is, it is judged that the delivery centers concerned are selectable as candidates for redelivery.

Then, the following describes the product/delivery truck storage room selection step s152 for selecting a replacement product and a proper delivery truck storage room in the processing of preparation for redelivery.

Figure 23:
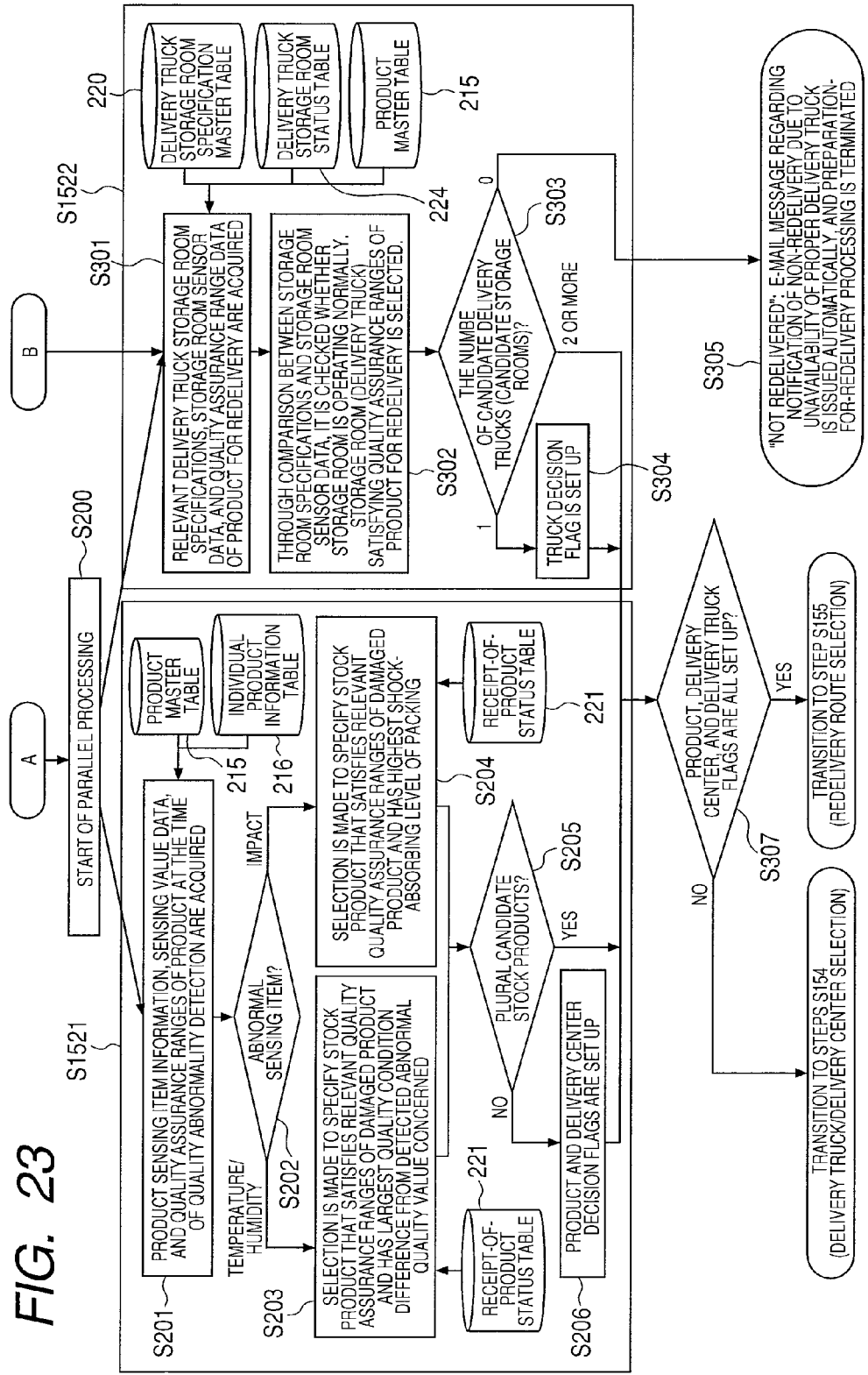
FIG. 23 is a flowchart of parallel processing in a product/delivery truck storage room selection step s152 to be taken for redelivery.

As shown in FIG. 23, a selection of a replacement product is made at step s1521, and a selection of a delivery truck storage room is made at step s1522. In a case where there is a replacement product available for redelivery, these steps s1521 and s1522 are carried out in parallel processing for enhancement in the efficiency of product selection and delivery truck storage room selection. At step s200 for the start of parallel processing, in case of detection of plural quality abnormalities, each process is started up for execution of plural preparation-for-redelivery processing operations. In execution of step s1521, for higher efficiency in searching for a replacement product for redelivery, product sensing information indicated at the time point of quality abnormality detection is acquired, and in the receipt-of-product status table 221, products having "Ready for shipment" indicated at the entry item of product status 487 are sorted in reverse chronological order of time and date entries 486. At step s201, product sensing item information and sensing value data at the time point of quality abnormality detection are acquired. Using product code data acquired at the inventory check step s151 and the individual product information table 216, a search is performed for a product code of the product concerned. With respect to product tag ID data excluding the product tag ID code corresponding to the detected quality abnormality, the sensing item is used as key information in acquisition of quality assurance ranges of the product concerned from the product master table 215. Then, at step s202, a branching operation is performed according to the sensing item corresponding to the detected quality abnormality. In a case where the sensing item corresponding to the detected quality abnormality is "temperature/humidity", a branch is made to step s203 to select a stock product that satisfies the relevant quality assurance ranges specified for the damaged product and that has the largest quality condition difference from the detected abnormal quality value concerned. In a case where the sensing item corresponding to the detected quality abnormality is "impact", a branch is made to step s204 to select a stock product that satisfies the relevant quality assurance ranges specified for the damaged product and that has the highest packing level. Then, at step s205, it is judged whether only one proper product can be determined uniquely. If plural candidate stock products are not involved, the product and delivery center decision flags are set up.

In execution of step s1522, a delivery truck storage room is selected. At step s301, the quality assurance ranges 423, 424, and 425 corresponding to the sensing items of the replacement product for redelivery are compared with the delivery truck storage room specifications 472, 473, and 474. In this comparison, a selection of a delivery truck storage room is made through judgment on whether the upper limit value of each quality assurance range of the product concerned exceeds the corresponding upper specification limit value of the delivery truck storage room and whether the lower limit value of each quality assurance range of the product concerned exceeds the corresponding lower specification limit value of the delivery truck storage room. Then, at step s302, with respect to the temperature, humidity, and impact specifications of the delivery truck storage room selected at step s301, storage room sensor data and quality assurance range data of the product for redelivery are acquired. Through comparison between the storage room specifications and the storage room sensor data, it is checked whether the storage room is operating normally. If the storage sensor data (storage sensing information) is within the specified ranges, the storage room is judged to be operating normally. Thus, the storage room (delivery truck) satisfying the quality assurance ranges of the product for redelivery is selected. At step s303, it is judged whether only one proper delivery truck storage room can be determined uniquely. If the number of candidate delivery trucks (candidate storage rooms) is "1", a truck decision flag is set up at step s304. If the number of candidate delivery trucks is "zero", the unavailability of a proper delivery truck is indicated at step s305, i.e., "Not redelivered" is issued, and the subsequent preparation-for-redelivery processing is not performed. In this case, as additional information regarding the product concerned, "Not redelivered" is registered in the entry item of delivery state 525 of the delivery status table 225. In addition, relevant e-mail messages to be described later are issued, and the preparation-for-redelivery processing is terminated. If the number of candidate delivery trucks is "2" or more, the truck decision flag is not set up.

After execution of steps s1521 and s1522, the conditions of the decision flags are checked at step s307. If all the flags are set up, a transition is made to the redelivery route selection step s155. If at least one of these flags is not set up, a transition is made to the delivery truck/delivery center selection step s154.

While parallel processing is performed for product selection and delivery truck storage room selection in the example demonstrated above, it is not necessarily required to implement the parallel processing in an application where emphasis is not placed on enhancement in the efficiency of processing because of such a principle that priority is given to facilitation of system development. For implementation of the parallel processing, there may be provided an arrangement that process numbers for synchronization are assigned to product selection and delivery truck storage room selection at the start of the parallel processing so as to ensure associative relationship therebetween. It is to be noted, however, that this arrangement is illustrative only and is not intended to limit the scope of the present invention.

In the example demonstrated above, a selection of a delivery truck storage room is made through judgment on whether the upper limit value of each quality assurance range of the product concerned exceeds the corresponding upper specification limit value of the delivery truck storage room and whether the lower limit value of each quality assurance range of the product concerned exceeds the corresponding lower specification limit value of the delivery truck storage room. However, in a situation where a quality assurance range of a product is relatively wide, it is presumed that a quality abnormality may not occur during delivery even under an out-of-specification condition, i.e., the above judgment may not be necessarily required. Depending on a principle of quality control in the delivery center concerned, judgment regarding the specifications of each delivery truck storage room may not be performed for reduction in delivery cost.

Described below is an exemplary situation where the product code is "49442423", the delivery center ID codes are "C-0001" and "C-0002", the stock quantity value is "2", and the sensing item corresponding to a detected quality abnormality is "temperature". For product selection, the product master table 215 is searched by using the product code "49442423" as key information, and the quality assurance temperature range "−30-0" is acquired from the product master table 215. Through judgment on the sensing item corresponding to the quality abnormality detected, a branch is made to "temperature". In the individual product information table 216, a search is performed for the product code "49442423". Thus, with the exclusion of the product tag ID code "3241BAE134328", the product tag ID codes "3241BAE134325" and "3241BAE134326" are acquired. Using the thus acquired product tag ID codes "3241BAE134325" and "3241BAE134326", a search is performed in the receipt-of-product status table 221. Through this search, it is found that the product status 487 is "shipment allowable" for both the product tag ID codes "3241BAE134325" and "3241BAE134326", and the sensing item of temperature 482 is "−10" for both the product tag ID codes "3241BAE134325" and "3241BAE134326". In comparative checking against the quality assurance temperature range "−30-0", it is judged that the sensing item of temperature 482 indicating "−10" is within the quality assurance temperature range. With respect to an abnormal temperature level of "30" for example (i.e., the quality abnormality detected), the number of candidate stock products is counted on the basis of the largest quality condition difference from the detected abnormal quality value concerned. Thus, it is found that there are plural candidate stock products. Hence, the product and delivery center decision flags are not set up, and the relevant synchronization is performed.

Then, for selection of a delivery truck storage room in execution of parallel processing, the delivery truck storage room specification master table 220 is examined. By searching the sensing item column of temperature 472 therein, the following temperature specifications are acquired: "−30-1" in the temperature specification of the storage room 1 of "T-0001", "0-30" in the temperature specification of the storage room 2 of "T-0001", and "−40-0" in the temperature specification of the storage room 1 of "T-0002". The product master table 215 is checked with respect to the product code "494-42423". Thus, the quality assurance temperature range "−30-0" is acquired from the item of quality assurance temperature range 423. In comparative checking on the storage room 1 of "T-0001", it is found that the upper limit value "0" of the quality assurance temperature range of the product is equal to or higher than the upper limit value "0" of the temperature specification of the storage room, and that the lower limit value "−30" of the quality assurance temperature range of the product is equal to or lower than the lower limit value "−30" of the temperature specification of the storage room. Hence, the requirements are satisfied in the use of the storage room 1 of "T-0001". In comparative checking on the storage room 2 of "T-0001", it is found that the upper limit value "0" of the quality assurance temperature range of the product is equal to or lower than the upper limit value "30" of the temperature specification of the storage room, and that the lower limit value "−30" of the quality assurance temperature range of the product is equal to or higher than the lower limit value "0" of the temperature specification of the storage room. Hence, the requirements are not satisfied in the use of the storage room 2 of "T-0001". In comparative checking on the storage room 1 of "T-0002", it is found that the upper limit value "0" of the quality assurance temperature range of the product is equal to or higher than the upper limit value "0" of the temperature specification of the storage room, and that the lower limit value "−30" of the quality assurance temperature range of the product is equal to or higher than the lower limit value "−40" of the temperature specification of the storage room. Hence, the requirements are not satisfied in the use of the storage room 1 of "T-0002". In the same manner, the sensing item columns of humidity 473 and impact 474 in the delivery truck storage specification master table 220 are checked through comparison with the corresponding quality assurance ranges of the product for redelivery. Thus, it is determined to use the storage room 1 of the delivery truck "T-0001" which has specifications capable of satisfying the quality assurance ranges of the product for redelivery. To check whether the storage room concerned is operating normally, the delivery truck storage room status table 224 is searched for the truck ID code "T-0001". Base on the latest time and date indication, "−10" at the sensing item of temperature 512, "40" at the sensing item of humidity 513, and "0.1" at the sensing item of impact are acquired with respect to the storage room 1 of "T-0001". These values thus acquired are compared with the temperature specification range "−30-0", humidity specification range "30-60", and impact specification range "0-1" of the storage room 1 of the delivery truck concerned. Thus, it is judged that the storage room concerned is operating normally since each of the current sensing information of the storage room is within the range specified therefor, i.e., it is determined to use the delivery truck "T-0001". Then, since the number of candidate delivery trucks (candidate storage rooms) is "1", the truck decision flag is set up.

In the result of synchronization of the product selection and the delivery truck storage room selection mentioned above, it is found that not all of the product, delivery center, and truck decision flags are set up. Hence, a transition is made to the delivery truck/delivery center selection step s154.

Then, the following describes the details of the delivery truck/delivery center selection step s154. As shown in FIG. 24, the processing described below is carried out in a case where plural candidate products for redelivery are stored in plural delivery centers, in a case where plural candidate delivery trucks applicable to redelivery are available, or in a case of combination of both the above cases.

At step s401, by using key information containing delivery truck ID codes of all the candidate delivery trucks selected in the processing of product/delivery truck storage room selection, the delivery truck master table 219 is searched to acquire the current locations of the candidate delivery trucks. Further, by using key information containing delivery center ID codes of all the delivery centers, the delivery center master table 217 is searched to acquire the addresses of the candidate delivery centers. Then, at step s402, in round-robin combinations of the acquired current locations of the candidate delivery trucks and the addresses of the candidate delivery centers, the shortest time length predictable for a delivery truck to arrive at a delivery center is calculated through use of the deliverer communication terminal 112 equipped with a delivery route selection system such as a car navigation system. Thereafter, at step s403, an optimal combination of a delivery truck and a delivery center is determined. If plural the shortest time lengths are found, a combination corresponding to the result of the first calculation is selected.

While an optimal combination of a delivery truck and a delivery center is determined by prioritizing the shortest time length predictable for a delivery truck to arrive at a delivery center in the example demonstrated above, there may also be provided an arrangement that an optimal combination of a delivery truck and a delivery center is determined according to the shortest total time length predictable in an overall delivery routing scheme wherein, after arriving at a delivery center, a delivery truck loaded with relevant products is run to each destination.

Described below is an exemplary situation where the delivery truck master table 219 is searched by using the truck ID code "T-0001" as key information, and the current location entry 462 "Totsuka Y, Yokohama, Kanagawa Prefecture" is acquired. In this situation, by using key information containing the candidate delivery center ID codes "C-0001" and "C-0002" that have been acquired in the product/delivery truck storage room selection step s152, the delivery center master table 217 is searched to acquire the address entries 422 "Totsuka F, Yokohama, Kanagawa Prefecture" and "Totsuka G, Yokohama, Kanagawa Prefecture". Through use of the delivery route selection system, it is found that it will take 10 minutes for the delivery truck "T-0001" to arrive at the delivery center "C-0001" and that it will take 20 minutes for the delivery truck "T-0001" to arrive at the delivery center "C-0002". Hence, an optimal combination of the delivery truck "T-0001" and the delivery center "C-0001" is determined.

Then, the following describes the details of the redelivery route selection step s155.

As shown in FIG. 25, at step s501, the current location indicated at the time point of quality abnormality detection, which has been held in the memory 211 at s032, is acquired as location information corresponding to the detected quality abnormality concerned. Then, at step s502, through use of the delivery route selection system mentioned in the description of the delivery truck/delivery center selection processing, a redelivery route calculation is performed under the preset condition that the location corresponding to the detected quality abnormality should be circumvented in redelivery routing from the delivery center where the product for redelivery is stored. At step s503, a shortest-time redelivery route to the destination concerned is determined. Then, the inventory table 213 is searched by using key information containing the delivery center ID code of the delivery center for redelivery and the product code of the product for redelivery, and the number of products to be delivered is subtracted from the stock quantity value of the record data concerned. Lastly, at step s504, as information indicating the use for redelivery in the receipt-of-product status table 221, "In preparation" is additionally registered into the entry item of product status 487 of the record data of the product for redelivery. In addition, relevant e-mail messages to be described later are issued automatically, and the redelivery route selection processing is terminated.

For example, as location information corresponding to the detected quality abnormality concerned, Totsuka A, Yokohama, Kanagawa Prefecture" is acquired based on the current location information indicated at the time point of quality abnormality detection, which has been held in the memory 211. Then, through use of the delivery route selection system, a redelivery route calculation is performed to determine a shortest-time redelivery route to the destination "Totsuka F, Yokohama, Kanagawa Prefecture" under the preset condition that the location corresponding to the detected quality abnormality "Totsuka A, Yokohama, Kanagawa Prefecture" should be circumvented in redelivery routing. At the last step of the redelivery route selection processing, to record the completion thereof in the receipt-of-product status table 221, "In preparation" is additionally registered into the entry item of product status 487 of the record data of the product for redelivery. Then, the redelivery route selection processing is terminated. Since "In preparation" is additionally indicated in the entry item of product status 487 of the receipt-of-product status table 221, the stock product concerned is reserved to prevent duplicate assignment thereof to a case of detection of another quality abnormality while the delivery truck is traveling to the delivery center for receiving the stock product for redelivery thereof.

Then, the following describes the details of automatic reporting by e-mail messages in the preparation-for-redelivery processing.

In a case where the redelivery of the product concerned is determined through the preparation-for-redelivery processing, e-mail messages are automatically issued to the customer, delivery truck, and the delivery center. The customer concerned is notified automatically by e-mail that the replacement product will be redelivered due to detection of a quality abnormality in the delivery operation. The delivery truck carrying the product that has been detected to be abnormal in quality is notified automatically by e-mail that the abnormal product detected and information thereof should not be handed over to the recipient concerned at the destination. Further, the delivery center in charge of redelivery of the replacement product is notified automatically by e-mail of a request for redelivery along with redelivery information including the product tag ID code of the replacement product, the product code thereof, and the delivery truck to be used for redelivery.

In a case where no stock product available for redelivery is found in product selection of the preparation-for-redelivery processing, the customer concerned is notified automatically by e-mail that no stock product for redelivery is available at present in an attempt of replacement due to detection of a quality abnormality in the delivery operation, and the delivery truck carrying the product that has been detected to be abnormal in quality is notified automatically by e-mail that the abnormal product detected and information thereof should not be handed over to the recipient concerned at the destination.

In a case where no proper delivery truck storage room available for redelivery is found in delivery truck storage room selection of the preparation-for-delivery processing, the customer concerned is notified automatically by e-mail that a stock product is not redeliverable at present in an attempt of replacement due to detection of a quality abnormality in the delivery operation, and the delivery truck carrying the product that has been detected to be abnormal in quality is notified automatically by e-mail that the abnormal product detected and information thereof should not be handed over to the recipient concerned at the destination.

Figure 26:
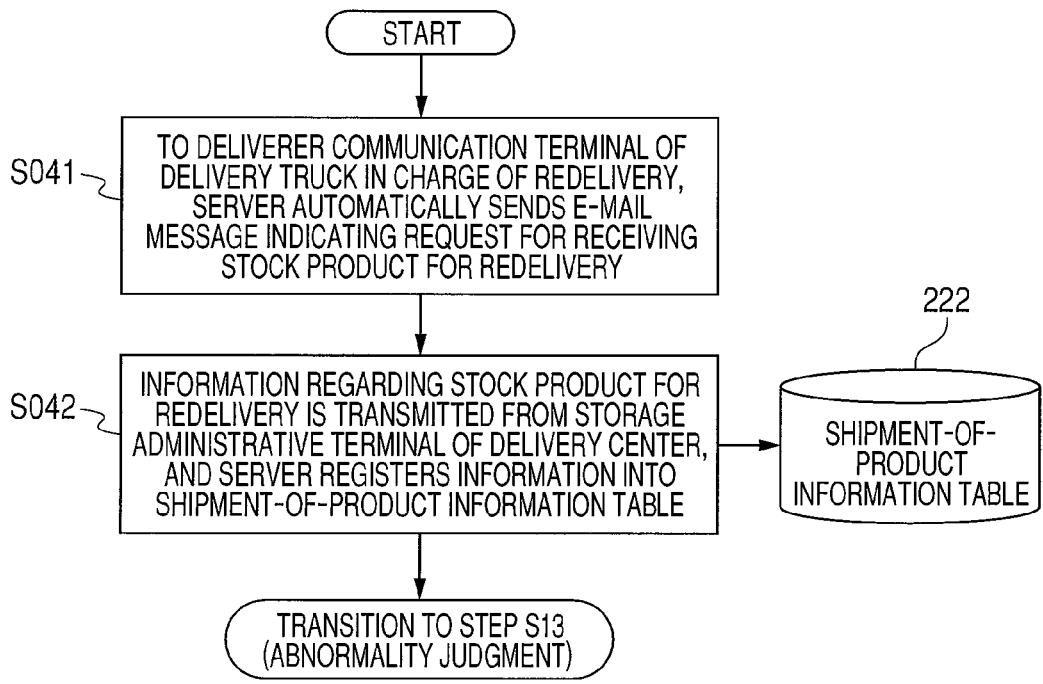
FIG. 26 is a flowchart of a redelivery procedural step s16 to be taken for delivering a replacement product in case of detection of a quality abnormality.

With reference to FIG. 26, the following describes the details of the redelivery procedural step s16 to be taken under redelivery conditions selected in the preparation-for-redelivery procedural step s15. At step s041, to the delivery truck 11 in charge of redelivery, the server 120 automatically transmits an e-mail message that indicates a request for redelivery, a delivery center 13 having the stock product for redelivery, an address thereof, and a product tag ID code of the stock product for redelivery. When the delivery truck in charge of redelivery arrives at the delivery center, a handover request for the stock product concerned is made to delivery center personnel according to the redelivery request information indicated in the e-mail message received by the delivery truck. Then, at step s042, the delivery center registers information regarding the stock product for redelivery into the shipment-of-product information table 222. On completion of the registration, the stock product concerned is handed over to the delivery truck. Thus, the delivery truck proceeds to actual redelivery service. Thereafter, during redelivery, the abnormality judgment procedural step s13 is repeated constantly.

Then, the following describes the details of the branching procedural step s17 shown in FIG. 16. At the branching procedural step s17, when the delivery truck arrives at the delivery destination, an announcement regarding the arrival thereof is provided through the delivery route selection system. Then, a transition is made to the arrival-of-product procedural step s18. If the announcement is not provided, a transition is made to the abnormality judgment procedural step s13. The transition to step s13 is repeated until the announcement is provided.

Figure 27:
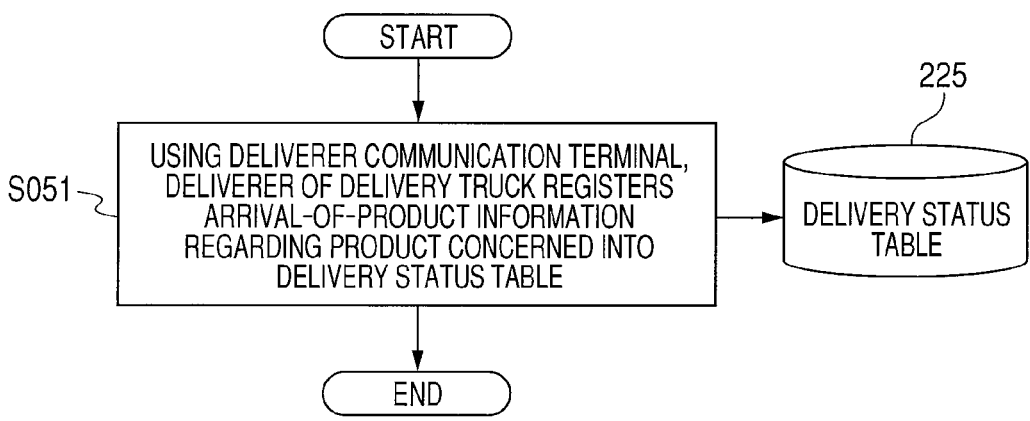
FIG. 27 is a flowchart of an arrival-of-product procedural step s18 to be taken at the time of arrival at a destination of product delivery.

With reference to FIG. 27, the following describes the details of the arrival-of-product procedural step s18. When the delivery truck arrives at the delivery destination without detecting any quality abnormality in the product concerned during the course of delivery, the product concerned is handed over to the recipient. At the time of acknowledgment of handover at the delivery destination, the sensor-integrated RFID tag is removed from the product concerned for collection thereof. Through the deliverer communication terminal, arrival-of-product information regarding the product concerned is sent to the server 120. Then, the server 120 enters relevant data into the delivery status table 225 according to the product tag ID code, product sensing information, delivery state ("Arrived"), and time and date of completion of delivery. Thus, a task of delivery to one destination is completed (step s051).

In the case of redelivery through execution of the processing operations described above, a stock product is selected on the basis of product sensing information indicating the largest quality condition difference from the detected abnormal quality value concerned. Thus, the likelihood of recurrence of a similar quality abnormality can be reduced. Further, since quality conditions of products in a delivery truck storage room are checked constantly, a preventive countermeasure can be readily taken against the occurrence of a quality abnormality due to a failure in quality assurance operation of the storage room. Still further, a delivery route where a quality abnormality has been detected in the first delivery operation is circumvented at the time of redelivery, e.g., an unpaved road route that has applied a significant level of impact to products in the first delivery operation is circumvented at the time of redelivery. Thus, it is possible to reduce the likelihood of recurrence of a similar quality abnormality.

Regarding the product selection processing at step s1521 described above, the following presents how to implement higher-speed operations therein.

Based on quality abnormality history information acquired in the past, a quality abnormality tendency is figured out with respect to each sensing item corresponding to each product code. Then, stock product data is sorted in relation to each abnormality-prone sensing item corresponding to each product code. By using the stock product data thus sorted, it is possible to carry out product selection at higher speed.

Described below is a specific example of processing for higher-speed product selection.

In the processing demonstrated here, differently from the case of the foregoing preferred embodiment, a step s2103 to be mentioned below is performed in lieu of the aforementioned step s203 for stock product selection. Further, as preconditions therefor, a step s2100 to be mentioned below is added to the aforementioned step s002 for receipt-of-product processing, and steps s2101 and s2102 to be mentioned below are added to the aforementioned step 5032 for abnormality judgment processing. In the product master table 215 stored in the database 230, an additional column is provided, and a quality abnormality history table 226 shown in FIG. 28 and a receipt-of-product status view 228 shown in FIG. 29 are used to implement higher-speed product selection. To be more specific, the product master table 215 is expanded to include a new additional column for "Quality abnormality item".

The quality abnormality history table 226 is stored into the database 230 held in the server 120 of the data center 12 similarly to the other data tables. The quality abnormality history table 226 contains the following entry items: a product tag ID 530 corresponding to an RFID tag 115 attached to each product that has encountered a quality abnormality, a product code 531 of each product concerned, temperature 532, humidity 533, impact 534 (sensing items indicated at the time of quality abnormality detection), an abnormality item 535, and an abnormality condition 536. The receipt-of-product status view 228 is a database view arranged as a combination of the receipt-of-product status table 221 and the individual product information table 216. Hence, the receipt-of-product status view 228 may be virtually created in the memory 221 or may be created as a data table stored in the database 230. The receipt-of-product status view 228 contains the following entry items: a product tag ID 550, a product code 551 for linkage with each product tag ID code, a delivery center ID 552, temperature 553, humidity 554, impact 555, a packing level 556, time and date 557, and a product status 558.

Then, the following describes the details of each processing operation.

At step s2100, in synchronous timing with registration into the receipt-of-product status table 221, product sensing information acquired through product sensing operations repeated at step s002 is registered into the receipt-of-product status view 228 with respect to products indicating the product status entry 487 "Ready for shipment" in the receipt-of-product status table 221. Thus, data entries are provided into the entry items of product tag ID 550, product code 551 for linkage with each product tag ID code, delivery center ID 552, temperature 553, humidity 554, impact 555, packing level 556, time and date 557, and product status 558 in the receipt-of-product status view 228. If any record data corresponding to a product tag ID code to be registered has already been contained in the receipt-of-product status view 228, the record data is updated according to the product tag ID code concerned.

At step s2101, in case of detection of a quality abnormality at step s032, quality abnormality record data is registered into the quality abnormality history table 226 in synchronous timing with registration thereof into the delivery status table 225. A product tag ID code corresponding to the quality abnormality detected at step s032 is registered into the entry item of product tag ID 530, and a product code 431 acquired from the individual product information table 216 by using the product tag ID code concerned as key information is registered into the entry item of product code 531. The temperature value 522, humidity value 523, and impact value 524 indicated at the time of quality abnormality detection are registered into the entry items of temperature 532, humidity 533, and impact 534 of the quality abnormality history table 226. The sensing item corresponding to the detected quality abnormality is registered into the abnormality item 535 of the quality abnormality history table 226. Through comparative checking between the sensing item value concerned and the relevant quality assurance range indicated in the product master table 215, it is judged whether the upper limit value or the lower limit value is exceeded. The result of this judgment is registered into the entry item of abnormality condition 536. Then, based on the abnormality item 535 and the abnormality condition 536 indicated in the quality abnormality history table 226, a quality abnormality tendency is figured out by examining each sensing item corresponding to each product code for quality abnormalities and by counting the number of quality abnormalities in terms of excess beyond the upper/lower limit value of the quality assurance range concerned. Thus, each abnormality-prone sensing item can be determined on a majority basis. In this processing, as information regarding the quality abnormality tendency, an indication such as "Temperature upper limit exceeded" is registered into record data corresponding to the product code concerned at the additional column "Quality abnormality item" included in the product master table 215. It is to be noted that the additional column included in the product master table 215 may be divided into "Abnormality item" and "Abnormality condition" in a fashion similar to the arrangement of the quality abnormality history table 226.

At step s2102, after completion of the above registration at step s2101, the receipt-of-product status view 228 is subjected to sort processing. In the receipt-of-product status view 228, a sort is performed according to identical product codes. Further, with respect to the column of the abnormality-prone sensing item determined as mentioned above, an ascending sort is performed in the case of excess beyond the upper limit value of the quality assurance range concerned, or a descending sort is performed in the case of excess beyond the lower limit value thereof. Even if there are plural products having the same sensing item value, it is not necessary to sort the plural products. In the example demonstrated here, the products having the same sensing item value are sorted in ascending order of product tag ID codes. In a case where the sensing item of impact is judged to be an abnormality-prone sensing item, a descending sort is performed in the column of packing level 556 since lower limit data is insignificant for quality assurance.

For example, in the quality abnormality history table 226 shown in FIG. 28, with respect to the product code 531 "4933333", there are four classified combinations of "Temperature" at the abnormality item 535 and "Upper limit exceeded" at the abnormality condition 536. Since the number of these classified combinations is the largest in comparison with other classified combinations, a quality abnormality tendency of the product concerned is judged to be a combination of "Temperature" and "Upper limit exceeded". As information regarding this quality abnormality tendency, "Temperature upper limit exceeded" is registered into record data corresponding to the product code concerned at the additional column "Quality abnormality item" included in the product master table 215. FIG. 29 shows the receipt-of-product status view 228 that has been sorted by using "Temperature upper limit exceeded" as key information.

The following describes the step s2103 for stock product selection to be performed in lieu of the aforementioned step s203.

At step s2103 for stock product selection, in case of detection of a quality abnormality, a combination of the sensing item corresponding to the detected quality abnormality concerned and a condition of excess beyond the upper/loser limit value of the quality assurance range concerned is compared with data entries in the additional column "Quality abnormality item" included in the product master table 215. If the combination meets the quality abnormality tendency indicated in the additional column "Quality abnormality item" of the product master table 215, the top record data in the sorted receipt-of-product status view 228 shown in FIG. 29 is specified to select a stock product for redelivery. If the combination does not meet the quality abnormality tendency indicated in the additional column "Quality abnormality item" of the product master table 215, a stock product for redelivery is selected through entire record data searching comparison on the basis of product sensing information indicating the largest quality condition difference from the detected abnormal quality value concerned in the same manner as in stock product selection processing at step s203. Then, the record data corresponding to the selected product tag ID code is removed from the receipt-of-product status view 228.

For example, in a situation where the product code "4933333" of the stock product for redelivery corresponds to "Temperature upper limit exceeded" in the additional column "Quality abnormality item" included in the product master table 215 and where the detected quality abnormality is "Temperature upper limit exceeded", a stock product is selected according to the product tag ID 550 "3241BAE134667" indicated in the top record data in the receipt-of-product status view 228 sorted on each product tag ID code (shown in FIG. 29).

While, in the aforementioned step s203 for stock product selection, the receipt-of-product status table is applied to select a stock product for redelivery through entire record data searching comparison on the basis of product sensing information indicating the largest quality condition difference from the detected abnormal quality value concerned, the processing operations demonstrated here are performed in a fashion that a quality abnormality tendency is figured out with respect to each sensing item corresponding to each product code on the basis of quality abnormality history information acquired in the past, and then stock product data is sorted in relation to each abnormality-prone sensing item corresponding to each product code in the receipt-of-product status view. Thus, on detection of a quality abnormality, it is checked whether there is a match with abnormality-prone sensing data prepared as mentioned above. Hence, just one search operation is required for stock product selection, making it possible to realize higher-speed product selection.

In the stock product selection processing described in the foregoing, each stock product for redelivery is selected on the basis of product sensing information indicating the largest quality condition difference from the detected abnormal quality value with respect to the quality assurance range concerned. The following describes another procedure for stock product selection for redelivery to be taken to further reduce the likelihood of recurrence of a similar quality abnormality at the time of redelivery.

At the aforementioned step s1521, a stock product selection for redelivery is performed based on just one immediately preceding case of a quality abnormality. Hence, in a situation where a stock product having a quality condition value in the vicinity of the upper level of the quality assurance range concerned is selected in the event of detection of a quality abnormality exceeding the lower limit thereof, it is presumable that the upper limit may be exceeded during redelivery. Further, in a situation where a stock product having a quality condition value in the vicinity of the lower limit of the quality assurance range concerned is selected in the event of detection of a quality abnormality exceeding the upper limit thereof, it is also presumable that the lower limit may be exceeded during redelivery. In consideration of these situations, a quality condition value having a tendency to nonoccurrence of a quality abnormality with respect to each product code is calculated by using history data regarding temperature, humidity, and impact values indicated at the time of shipment of products delivered to destinations without occurrence of a quality abnormality, and a stock product is selected according to approximation of the quality condition value thus calculated. This makes it possible to select a stock product less susceptible to recurrence of a similar quality abnormality at the time of redelivery.

Described below is a specific example of other processing for stock product selection.

In the processing demonstrated here, differently from the case of the foregoing preferred embodiment, a step s2203 to be mentioned below is performed in lieu of the aforementioned step s203 for stock product selection. Further, as preconditions therefor, a step s2200 to be mentioned below is added to the aforementioned step s002 for receipt-of-product processing, a step s2201 to be mentioned later is added in lieu of the aforementioned steps s2101 and s2102 to the step s032 for abnormality judgment processing, and a step s2202 is added to the step s051 for arrival-of-product processing. In the product master table 215 stored in the database 230, additional columns are provided. For implementing stock product selection, a receipt-of-product status view 229 shown in FIG. 31 is used in lieu of the aforementioned receipt-of-product status view 228, in combination with the arrival-of-product history table 227 shown in FIG. 30. To be more specific regarding the additional columns, the product master table 215 is expanded to include new additional columns for "Average temperature", "Average humidity", and "Average impact" in addition to the aforementioned additional column "Quality abnormality item". The arrival-of-product history table 227 is stored into the database 230 held in the server 120 of the data center 12 similarly to the other data tables. The arrival-of-product history table 227 contains the following entry items: a product tag ID 540 corresponding to an RFID tag 115 attached to each product that has arrived at the destination concerned without incurring any quality abnormality, a product code 541 for linkage with the product concerned, and temperature 542, humidity 543, and impact 544 that are sensing items indicated at the time of shipment of the product concerned from the delivery center.

Then, the following describes the details of each processing operation.

At step s2200, in synchronous timing with registration into the receipt-of-product status table 221, product sensing information acquired through product sensing operations repeated at step s002 is registered into the receipt-of-product status view 229 with respect to products indicating the product status 487 "Ready for shipment" in the receipt-of-product status table 221. Thus, data entries are provided into the entry items of product tag ID 550, product code 551 for linkage with each product tag ID code, delivery center ID 552, temperature 553, humidity 554, impact 555, packing level 556, time and date 557, and product status 558 in the receipt-of-product status view 229. If any record data corresponding to a product tag ID code to be registered has already been contained in the receipt-of-product view 229, the record data is updated according to the product tag ID code concerned.

At step s2201, every time a quality abnormality is detected at step s032, a quality abnormality tendency is figured out in the same manner as in the aforementioned step s2101. Regarding record data of the product code corresponding to the detected quality abnormality, relevant registration is made in the quality abnormality history table 226. Further, the additional column "Quality abnormality item" included in the product master table 215 is updated.

At step s2202, relevant information is registered, in synchronous timing with registration of arrival-of-product information, into the delivery status table 225 in step s051 for arrival-for-product processing. When the product concerned arrives at the destination thereof in step s051 for arrival-of-product processing, the product tag ID code of the product concerned is acquired. Further, by using the product tag ID code and the product status 487 "Shipped" as key information, the receipt-of-product status table 221 is searched to acquire product sensing information 482, 483, and 484 indicated at the time of shipment of the product that has arrived at the destination. The product sensing information is registered into the entry items of temperature 542, humidity 543, and impact 544. Then, for each product code 541, an average value is calculated with respect to each of the entry items of temperature, humidity, and impact. The average value thus calculated is treated as a value representing a condition that is less susceptible to occurrence of a quality abnormality in each of the quality assurance ranges concerned. Then, in "Average temperature", "Average humidity", and "Average impact" of the expanded product master table 215, the average values at the time of shipment of the products indicated as "Arrived" in the history data are registered with respect to the record data corresponding to the product code concerned. Then, the receipt-of-product status view 229 is sorted for each identical product code. Further, an abnormality-prone sensing item is extracted from the column "Quality abnormality item" of record data of the product code concerned indicated in the expanded product master table 215. For example, in the case of "Temperature upper limit exceeded", the sensing item "Temperature" is extracted as an abnormality-prone sensing item. Then, from "Average temperature", "Average humidity", and "Average impact" of the product master table 215, a sensing item corresponding to the extracted sensing item is acquired. That is, in the case of "Temperature", a value of "Average temperature" is selected. Then, based on the value thus selected, record data of the product concerned is sorted in the receipt-of-product status view 229. In this sorting, a difference between the selected value and each sensing item value (each temperature value 553 in the case of the abnormality-prone sensing item "Temperature") is used. A sort operation is performed in ascending order of differences. In a case where the sensing item of impact is extracted as an abnormality-prone sensing item, a descending sort is performed in the column of packing level 556 since lower limit data is insignificant for quality assurance. On an each-time basis of product arrival in step s051 for arrival-of-product processing, the processing step s2202 is performed. Thus, the receipt-of-product status view 229 is updated, an average value of the abnormality-prone sensing item is recalculated, and relevant record is sorted again as mentioned above.

For example, through an averaging calculation on temperature history data 542 indicated at the time of shipment for the product code 541 "4933333", the average temperature value "−4" is obtained. In the column "Average temperature" of the product master table 215, this value is registered as record data corresponding to the product code "4933333". For "Average humidity" and "Average impact", an averaging calculation and a registration operation are performed in a similar manner. The receipt-of-product view 229 shown in FIG. 31 contains data that has been sorted on the average temperature value "−4" with respect to temperature data 553.

The following describes the processing step 2203 that is performed in lieu of the aforementioned step s203 for stock product selection.

In stock product selection on detection of a quality abnormality, the sensing item corresponding to the detected quality abnormality is acquired, and the additional column "Quality abnormality" included in the product master table 215 is checked for combinational comparison therewith. If a match is found with an abnormality-prone sensing item indicated in the additional column "Quality abnormality item", the top record data in the sorted receipt-of-product status view 229 is specified to select a stock product for redelivery. It is to be noted, however, that if a match is found with other than an abnormality-prone sensing item indicated in the additional column "Quality abnormality item", a stock product for redelivery is selected through entire record data searching comparison on the basis of product sensing information indicating the largest quality condition difference from the detected abnormal quality value concerned in the same manner as in stock product selection processing at step s203. Then, the record data corresponding to the selected product tag ID code is removed from the receipt-of-product status view 229.

For example, in a situation where the product code "4933333" of the stock product for redelivery corresponds to "−4" in the additional column "Average temperature" included in the product master table 215 and where the detected quality abnormality is "Temperature", a stock product is selected according to the product tag ID 550 "3241BAE134867" indicated in the top record data in the receipt-of-product status view 229 that has been sorted on each product tag ID code and further sorted in ascending order of differences between temperature data 553 and average temperature data on each product code (shown in FIG. 31).

In execution of the processing operations described above, on the basis of quality abnormality history information acquired in the past and arrival-of-product information, abnormality-prone sensing item information and abnormality-resistant sensing item information indicated at the time of shipment are calculated for each product code, and a product selection is made according to approximation of the result of calculation. In this manner, a stock product having a value representing a condition that is less susceptible to occurrence of a quality abnormality is selected. Thus, it is possible to select a stock product that is unlikely to incur a condition of excess beyond each of the upper and lower limit values of the quality assurance ranges, i.e., it is possible to select a stock product that is further less susceptible to occurrence of a quality abnormality. Further, stock product data is sorted in relation to each abnormality-prone sensing item corresponding to each product code in the receipt-of-product view 229. Thus, on detection of a quality abnormality, it is checked whether there is a match with abnormality-prone sensing item data prepared as mentioned above. Hence, just one search operation is required for stock product selection, making it possible to implement product selection at speed higher than that in the aforementioned product selection step s1521.

While frozen foods and precision apparatuses are assumed as products to be delivered in the descriptions given so far, the present invention is applicable to any other kinds of products to be delivered. In addition, the present invention is also applicable to a variety of product delivery schemes including product delivery schemes based on Internet shopping/purchasing.

Further, while a sensor-integrated RFID tag is used in the above preferred embodiments, a sensor and an RFID tag may be provided in a mutually separated form. In this case, a sensor ID code and a product tag ID code should be linked in a one-to-one correspondence.

Still further, while the server is installed in the data center in the above preferred embodiments, the server may be installed in a particular delivery center, for example. There may also be provided such an arrangement that the control terminal and the storage administrative terminal are disposed in a single integrated form. In a case where the server is installed in a particular delivery center, the server and these terminals may be provided in a single integrated form.

Furthermore, while a unit of measure used to represent sensing value data is invariable for data sharing in the product delivery system as in the processing at step s2200 in the above preferred embodiments, there may be provided an arrangement in which a unit of measure is converted to allow data sharing in cases where different units of measure are used, e.g., the Fahrenheit temperature scale used by a temperature sensor is converted to the Celsius temperature scale for data sharing in the product delivery system. It is assumed that a unit-of-measure conversion is performed at the time of registration into the database, for example.

Moreover, while it is checked whether the storage room of the delivery center is operating normally as in the processing at step s301 in the above preferred embodiments, this checking is performed for enhancement in reliability and is therefore optional in carrying out the present invention.

As set forth hereinabove and according to the preferred embodiments of the present invention, it is possible to significantly reduce time and cost that are required in a conventional product delivery system for labor-intensive detection of quality abnormalities, investigation of detailed causes of quality abnormalities, notification regarding detected quality abnormalities to customers requesting product delivery, delivery centers, and deliverers, and procedures for product redelivery. Note that the causes of quality abnormalities include conditions exceeding quality assurance ranges due to environmental changes, failures of apparatuses used for product storage, misplacement of products in storage rooms, impacting to products due to unpaved road conditions, etc.

What is claimed is:

1. A product delivery system for delivering products of various kinds each having at least one specified quality assurance range, the product delivery system comprising:
   a first memory configured to store product information regarding a plurality of products having the same specified quality assurance range;
   a second memory configured to store delivery vehicle information regarding characteristics of a plurality of delivery vehicles used for delivering products;
   information receiving unit configured to receive, from each delivery vehicle, abnormality information regarding detection of a quality abnormality that is a condition exceeding the specified quality assurance range of each product placed in a storage environment, and product identification information for identifying each product;
   product specifying unit configured to specify a product to be redelivered according to the stored product information regarding the plurality of products having the same specified quality assurance range;
   delivery vehicle specifying unit configured to propose information regarding each delivery vehicle having characteristics capable of satisfying the specified quality assurance range of the specified product to be redelivered according to the stored delivery vehicle information regarding characteristics of the plurality of delivery vehicles used for delivering products;
   delivery vehicle information extracting unit configured to extract information regarding each delivery vehicle that meets redelivery conditions required for the specified product to be redelivered according to the proposed information regarding each delivery vehicle having characteristics capable of satisfying the specified quality assurance range of the specified product to be redelivered; and
   output unit configured to output the extracted information regarding each delivery vehicle to indicate a candidate delivery vehicle for the specified product to be redelivered,
   wherein the product specifying unit is configured to:
     specify preferentially a product less susceptible to a quality abnormality similar to a detected quality abnormality according to the stored product information; and
     specify a product that meets the redelivery conditions at the time of redelivery by referring to information that indicates a product state monitored at every constant time interval.

2. The product delivery system according to claim 1, wherein the redelivery conditions include an indication of time and date of redelivery, a place of each delivery center, and a current location of each delivery vehicle, which are memorized along with the characteristics of the plurality of delivery vehicles.

3. The product delivery system according to claim 1, further comprising:
   an additional information extracting unit configured to extract information regarding a candidate delivery vehicle according to the kind of a detected quality abnormality for the specified product to be redelivered through selection based on the extracted information regarding each delivery vehicle.

4. The product delivery system according to claim 1, wherein each of the products includes packing material therefor.

5. The product delivery system according to claim 4, further comprising:
   a history information storing unit configured to store history information regarding quality abnormalities detected in the past with respect to each sensing item for abnormality detection in each product;
   wherein the product specifying unit is configured to specify a product to be redelivered according to the stored history information.

6. The product delivery system according to claim 5, wherein the history information storing unit is configured to sort the history information on the basis of each sensing item and to store the history information thus sorted.

7. The product delivery system according to claim 1, wherein the system is further configured to provide a first selection processing for determining a product to be redelivered through selection from a plurality of kinds of quality abnormalities, and a second selection processing for determining a delivery truck storage room having specifications that are within required quality assurance ranges; and
   wherein the first selection processing and the second selection processing are carried out in synchronous parallel operation while ensuring associative relationship therebetween.

8. The product delivery system according to claim 1, wherein the system is further configured to determine a shortest-time redelivery route to be taken by a candidate delivery vehicle so as to circumvent a route where a location corresponding to a detected quality abnormality has been indicated.

9. A product delivery method for delivering products of various kinds each having at least one specified quality assurance range, the method executed by a server that includes a computer and a memory and is included in a product delivery system, the product delivery method comprising:
   storing, using the server, product information regarding a plurality of identical products having the same specified quality assurance range into the memory;
   storing, using the server, delivery vehicle information regarding characteristics of a plurality of delivery vehicles used for delivering products into the memory;
   receiving, using the server, from each delivery vehicle, abnormality information regarding detection of a quality abnormality that is a condition exceeding the specified quality assurance range of each product placed in a storage environment, and product identification information for identifying each product;
   specifying, using the server, a product to be redelivered according to the stored product information regarding the plurality of products having the same specified quality assurance range;
   proposing, using by the server, information regarding each delivery vehicle having characteristics capable of satisfying the specified quality assurance range of the specified product to be redelivered according to the stored delivery vehicle information regarding characteristics of the plurality of delivery vehicles used for delivering products;

extracting, by the server, information regarding each delivery vehicle that meets redelivery conditions required for the specified product to be redelivered according to the proposed information regarding each delivery vehicle having characteristics capable of satisfying the specified quality assurance range of the specified product to be redelivered; and outputting, using the server, the extracted information regarding each delivery vehicle to indicate a candidate delivery vehicle for the specified product to be redelivered, wherein the specifying a product to be redelivered further comprises:

specifying preferentially a product less susceptible to a quality abnormality similar to a detected quality abnormality according to the stored product information; and specifying a product that meets the redelivery conditions at the time of redelivery by referring to information that indicates a product state monitored at every constant time interval, by the server.

10. The product delivery method according to claim 9, wherein the redelivery conditions include an indication of time and date of redelivery, a place of each delivery center, and a current location of each delivery vehicle, which are memorized along with the characteristics of the plurality of delivery vehicles.

11. The product delivery method according to claim 9, further comprising:

extracting, using the server information regarding a candidate delivery vehicle according to the kind of a detected quality abnormality for the specified product to be redelivered through selection based on the extracted information regarding each delivery vehicle.

12. The product delivery method according to claim 9, wherein each of the products includes packing material therefor.

13. The product delivery method according to claim 12, further comprising:

storing, using the server, history information regarding quality abnormalities detected in the past with respect to each sensing item for abnormality detection in each product;

wherein the specifying a product to be redelivered further comprises specifying, using the server, a product to be redelivered according to the stored history information.

14. The product delivery method according to claim 13, wherein the step of storing history information further comprises sorting, using the server, the history information on the basis of each sensing item and storing, using the server, the sorted history information.

15. The product delivery method according to claim 9, further comprising a first selection processing for determining, using the server, a product to be redelivered through selection from a plurality of kinds of quality abnormalities, and a second selection processing for determining, using the server, a delivery truck storage room having specifications that are within required quality assurance ranges;

wherein the first selection processing and the second selection processing are carried out in synchronous parallel operation while ensuring associative relationship therebetween.

16. The product delivery method according to claim 9, further comprising determining, using the server, a shortest-time redelivery route to be taken by a candidate delivery vehicle so as to circumvent a route where a location corresponding to a detected quality abnormality has been indicated.

* * * * *